US010215367B2

(12) United States Patent
Adema et al.

(10) Patent No.: US 10,215,367 B2
(45) Date of Patent: Feb. 26, 2019

(54) APPARATUS FOR WAVELENGTH CONVERSION

(71) Applicant: CHRISTIE DIGITAL SYSTEMS USA, INC., Cypress, CA (US)

(72) Inventors: Daniel Robert Adema, Kitchener (CA); Joseph Ma, Waterloo (CA); Graham Hill, Waterloo (CA); John Domm, Kitchener (CA)

(73) Assignee: CHRISTIE DIGITAL SYSTEMS USA, INC., Cypress, CA (US)

( * ) Notice: Subject to any disclaimer, the term of this patent is extended or adjusted under 35 U.S.C. 154(b) by 0 days.

(21) Appl. No.: 15/346,867

(22) Filed: Nov. 9, 2016

(65) Prior Publication Data

US 2018/0128451 A1 May 10, 2018

(51) Int. Cl.

| F21V 13/14 | (2006.01) |
|---|---|
| F21V 29/70 | (2015.01) |
| F21K 9/64 | (2016.01) |
| F21V 5/00 | (2018.01) |
| F21V 7/00 | (2006.01) |
| F21V 7/06 | (2006.01) |
| G02B 27/14 | (2006.01) |
| G02B 19/00 | (2006.01) |

(Continued)

(52) U.S. Cl.
CPC ............... *F21V 13/14* (2013.01); *F21K 9/64* (2016.08); *F21V 5/008* (2013.01); *F21V 7/0033* (2013.01);
(Continued)

(58) Field of Classification Search
CPC .......... F21V 13/14; F21V 29/70; F21V 5/008; F21V 7/0033; F21V 7/06; F21V 13/04;
(Continued)

(56) References Cited

U.S. PATENT DOCUMENTS

| 4,743,759 A | 5/1988 | Boutet |
| 5,857,767 A * | 1/1999 | Hochstein ............. F21S 48/328 |
| | | 362/294 |

(Continued)

FOREIGN PATENT DOCUMENTS

| CN | 103615672 A | 3/2014 |
| CN | 104345535 A | 2/2015 |

(Continued)

OTHER PUBLICATIONS

A. Giesen, et al., "Scalable Concept for Diode-Pumped High-Power Solid-State Lasers", Applied Physics B Lasers and Optics, B 58, 365-372 (1994).

(Continued)

*Primary Examiner* — Bao Q Truong
(74) *Attorney, Agent, or Firm* — Perry + Currier, Inc.

(57) ABSTRACT

There is provided an apparatus for wavelength conversion, comprising a wavelength converter, a first reflector, a second reflector, a third reflector, and a first lens. The first reflector has a curvature and is configured to reflect a plurality of input light beams onto the second reflector. The second reflector is configured to reflect the input light onto the third reflector. The first lens is disposed between the wavelength converter and the third reflector. The third reflector is configured to reflect the input light through the first lens and onto the wavelength converter, which is then excited to emit an emitted light. The first lens is configured to receive at least a portion of the emitted light, reduce its divergence, and at least partially transmit it to form an output light propagating towards the third reflector, which is configured to at least partially transmit the output light.

20 Claims, 23 Drawing Sheets

(51) Int. Cl.
*G03B 21/20* (2006.01)
*F21Y 115/30* (2016.01)

(52) U.S. Cl.
CPC ............... *F21V 7/06* (2013.01); *F21V 29/70* (2015.01); *G02B 19/0028* (2013.01); *G02B 19/0057* (2013.01); *G02B 27/141* (2013.01); *G03B 21/204* (2013.01); *F21Y 2115/30* (2016.08)

(58) Field of Classification Search
CPC . F21V 7/0025; F21V 7/00; F21V 9/30; F21V 9/32; F21V 9/35; F21K 9/64; G02B 27/141; G02B 19/0028; G02B 19/0057; F21Y 2115/30; G03B 21/204
See application file for complete search history.

(56) References Cited

U.S. PATENT DOCUMENTS

| | | | |
|---|---|---|---|
| 9,046,750 B2 * | 6/2015 | Matsubara | G03B 21/204 |
| 9,074,755 B2 | 7/2015 | Finsterbusch et al. | |
| 9,383,070 B2 * | 7/2016 | Khrushchev | F21K 9/56 |
| 2013/0321777 A1 | 12/2013 | Wang et al. | |
| 2014/0146293 A1 | 5/2014 | Hirata et al. | |
| 2015/0167905 A1 | 6/2015 | Khrushchev | |
| 2016/0215947 A1 * | 7/2016 | Matsuno | F21S 48/1145 |

FOREIGN PATENT DOCUMENTS

| | | |
|---|---|---|
| EP | 2642178 A1 | 11/2010 |
| EP | 2919068 A1 | 10/2013 |
| EP | 2980622 A1 | 7/2015 |
| WO | 2011/019505 A1 | 2/2011 |
| WO | 2014121707 A1 | 8/2014 |

OTHER PUBLICATIONS http://www.eli-beams.eu/wp-content/uploads/2013/11/Speiser_thin_disk_hist_scaling.pdf.

EPO, Extended European Search Report, dated Feb. 9, 2018, re European Patent Application No. 17174850.2.

EPO, Extended European Search Report, dated Feb. 13, 2018, re European Patent Application No. 17194267.5.

* cited by examiner

APPARATUS FOR WAVELENGTH CONVERSION

FIELD

The present specification relates to an apparatus for wavelength conversion, and in particular to an apparatus for wavelength conversion which apparatus comprises a curved reflector.

BACKGROUND

Many light sources use laser pump light to excite and cause a photoluminescent material to emit a luminescence light, which is then collected and used for a further application such as projecting images on a screen. Often such light sources require a large number of laser diodes, whose beams need to be collected and directed onto the photoluminescent material within predetermined etendue limits. Collecting and directing such a large number of laser beams can require numerous reflective surfaces, which can make the optical system bulky and difficult to manufacture and properly align. Moreover, adding additional laser diodes can require corresponding additional reflective surfaces, which can in turn add to the complexity of the optical system as well as increasing the etendue of the light source.

In addition to the challenges of directing the pump light onto the photoluminescent material, collecting and conditioning the luminescence light can also pose challenges. For example, the luminescence light can have a Lambertian profile requiring collection optics to be placed very close to the photoluminescence material in order to efficiently capture the luminescence light. In addition, the collection optics can require additional lenses to condition and/or collimate the luminescence light. However, such collection optics can be in the way of and interfere with the pump light reaching the photoluminescent material.

SUMMARY

The present specification is directed to an apparatus for wavelength conversion. This apparatus comprises a wavelength converter comprising a wavelength conversion material, a first reflector, a second reflector, a third reflector, and a first lens. The first reflector is configured to reflect a plurality of input light beams onto the second reflector. Moreover, the first reflector has a curvature that is configured to increase a convergence of the input light beams reflected from the first reflector.

The second reflector is configured to reflect the input light beams onto the third reflector. In addition, the first lens is disposed between the wavelength converter and the third reflector, and also proximate to the wavelength converter. The third reflector is configured to reflect the input light beams through the first lens and onto the wavelength conversion material. The input light beams, in turn, are configured to excite the wavelength conversion material to emit an emitted light that is wavelength-shifted relative to the input light beams.

The first lens is configured to receive at least a portion of the emitted light, to reduce a divergence of the portion of the emitted light, and to at least partially transmit the portion of the emitted light to form an output light propagating towards the third reflector. The third reflector, in turn, is further configured to at least partially transmit the output light Use of the curved first reflector allows for directing and converging a large number of beams of input light towards the wavelength conversion material without the need for a multitude of reflective surfaces. In addition, in order to accommodate additional light sources, for example to increase the power and/or brightness of the excitation input light, simply a larger curved first reflector can be used. This, in turn, obviates the need for additional reflectors to accommodate the added light sources.

In addition, in this apparatus the second and third reflectors cooperate to direct the beams of input light such that they pass only through the one lens, i.e. the first lens, on their way to the wavelength conversion material. In this manner, collection optics having multiple lenses can be placed very close to the wavelength conversion material to collect and condition the emitted light without the need for the input light to pass through, and potentially become distorted/degraded by, the additional lenses.

In this specification, elements may be described as "configured to" perform one or more functions or "configured for" such functions. In general, an element that is configured to perform or configured for performing a function is enabled to perform the function, or is suitable for performing the function, or is adapted to perform the function, or is operable to perform the function, or is otherwise capable of performing the function.

It is understood that for the purpose of this specification, language of "at least one of X, Y, and Z" and "one or more of X, Y and Z" can be construed as X only, Y only, Z only, or any combination of two or more items X, Y, and Z (e.g., XYZ, XY, YZ, ZZ, and the like). Similar logic can be applied for two or more items in any occurrence of "at least one . . . " and "one or more . . . " language.

An aspect of the present specification provides an apparatus for wavelength conversion, the apparatus comprising: a wavelength converter comprising a wavelength conversion material; a first reflector, a second reflector, a third reflector, and a first lens; the first reflector configured to reflect a plurality of input light beams onto the second reflector, the first reflector having a curvature configured to increase a convergence of the input light beams reflected from the first reflector; the second reflector configured to reflect the input light beams onto the third reflector; the first lens disposed between the wavelength converter and the third reflector, the first lens disposed proximate to the wavelength converter; the third reflector configured to reflect the input light beams through the first lens and onto the wavelength conversion material, the input light beams configured to excite the wavelength conversion material to emit an emitted light being wavelength-shifted relative to the input light beams; the first lens configured to receive at least a portion of the emitted light, to reduce a divergence of the portion of the emitted light, and to at least partially transmit the portion of the emitted light to form an output light propagating towards the third reflector; and the third reflector further configured to at least partially transmit the output light.

The apparatus can further comprise a second lens configured to receive the output light propagating from the first lens, the second lens configured to further reduce the divergence of the output light.

The second lens can comprise a flat side configured to receive the output light and a convex side opposite the flat side, the flat side being the third reflector.

The flat side can comprise a dichroic coating configured to reflect the input light beams and transmit the output light.

The apparatus can further comprise a third lens configured to receive the output light propagating from the second lens, the third lens configured to further reduce the divergence of the output light.

The first lens can comprise a first side configured to receive the portion of the emitted light, and a corresponding convex side opposite the first side.

The third lens can comprise a corresponding flat side configured to receive the output light from the second lens and a corresponding convex side opposite the corresponding flat side.

The first side can comprises one or more of: a corresponding flat side and a concave side.

One or more of the first lens, the second lens, and the third lens can be hemispherical.

The first reflector can comprise a parabolic reflector.

The parabolic reflector can define an aperture for passage of the output light.

The first reflector, the second reflector, the third reflector, and the first lens can be configured to converge the input light beams at the wavelength conversion material.

The wavelength conversion material can be disposed on the second reflector, and the second reflector can comprise a surface of a heat sink.

A first distance between the second reflector and the first lens can be equal to or smaller than a second distance between the wavelength conversion material and the first lens.

The apparatus can further comprise a plurality of light sources each configured to emit a corresponding one of the input light beams.

The plurality of light sources can be mounted on a common surface being thermally coupled to a heat sink.

The input light beams can be about parallel to one another.

The first lens can be spaced from the wavelength converter by a gap.

The gap can be in a range of about 1 mm to about 2 mm.

The wavelength conversion material can comprise one of a phosphor and quantum dots.

The wavelength conversion material can be shaped as a ring and the wavelength converter can be rotatable about a center of the ring.

Another aspect of the present specification provides an apparatus for wavelength conversion, the apparatus comprising: a wavelength converter comprising a wavelength conversion material configured to absorb a first portion of one or more input light beams configured to excite the wavelength conversion material to emit an emitted light and to reflect a second portion of the one or more input light beams to form one or more unabsorbed light beams, a base reflector, a differential reflector, a retro reflector, and a first lens. The first lens is disposed between the wavelength conversion material and the differential reflector. The wavelength conversion material, the differential reflector, the base reflector, and the retro reflector define an unabsorbed light path extending from the wavelength conversion material, through the first lens, onto the differential reflector, onto the base reflector, and onto the retro reflector. The base reflector is configured to reflect the one or more input light beams onto the differential reflector. The differential reflector is configured to reflect the one or more input light beams through the first lens and onto the wavelength conversion material. The first lens is configured to receive at least a portion of the emitted light, to reduce a divergence of the portion of the emitted light, and to at least partially transmit the portion of the emitted light to form an output light propagating towards the differential reflector. The differential reflector is further configured to at least partially transmit the output light. The first lens is further configured to receive and transmit the one or more unabsorbed light beams propagating along the unabsorbed light path from the wavelength conversion material towards the retro reflector; and the retro reflector is configured to reflect the one or more unabsorbed light beams back towards the wavelength conversion material along the unabsorbed light path.

The apparatus can further comprise a second lens configured to receive the output light propagating from the first lens, the second lens configured to further reduce the divergence of the output light.

The second lens can comprise a flat side configured to receive the output light and a convex side opposite the flat side, the flat side being the differential reflector.

The flat side can comprise a dichroic coating configured to reflect the one or more input light beams and the one or more unabsorbed light beams and to transmit the output light.

The apparatus can further comprise a third lens configured to receive the output light propagating from the second lens, the third lens configured to further reduce the divergence of the output light.

One or more of: the first lens can comprise a first side configured to receive the portion of the emitted light, and a corresponding convex side opposite the first side; and the third lens can comprise a corresponding flat side configured to receive the output light from the second lens and a corresponding convex side opposite the corresponding flat side.

The first side can comprise one or more of: a corresponding flat side; and a concave side.

The wavelength conversion material can be disposed on the base reflector.

The first lens can be spaced from the wavelength converter by a gap.

The gap can be in a range of about 1 mm to about 2 mm.

The apparatus can further comprise: a first reflector configured to reflect the one or more input light beams onto the base reflector, the first reflector having a shape configured to increase a convergence of the one or more input light beams reflected from the first reflector; and the unabsorbed light path can be further defined by the first reflector wherein the unabsorbed light path extends from the wavelength conversion material, through the first lens, onto the differential reflector, onto the base reflector, onto the first reflector, and onto the retro reflector.

The first reflector can comprise one of a parabolic reflector, a stepped reflector, and a faceted reflector.

The first reflector can define an aperture for passage of the output light.

The first reflector, the base reflector, the differential reflector, and the first lens can be configured to converge the one or more input light beams at the wavelength conversion material.

The apparatus can further comprise: a support; a plurality of receiving banks disposed on the support, each receiving bank configured to receive light sources each configured to emit a corresponding one of the one or more input light beams; and one or more further retro reflectors disposed on the support. Each given receiving bank can have a corresponding retro reflector configured to reflect the one or more unabsorbed light beams generated by the one or more input light beams emitted by the light sources receivable in the given receiving bank.

The support can comprise an annular member; the receiving banks and the retro reflectors can be disposed radially on the annular member; and the receiving banks and the retro reflectors can be disposed in an alternating arrangement on the annular member, each receiving bank disposed diametrically opposite a corresponding retro reflector.

The wavelength conversion material can comprise one of a phosphor and quantum dots.

Another aspect of the present specification provides an apparatus for wavelength conversion, the apparatus comprising: a wavelength converter comprising a wavelength conversion material configured to absorb a first portion of an input light beam configured to excite the wavelength conversion material to emit an emitted light and to reflect a second portion of the input light beam to form an unabsorbed light beam; a fourth reflector, a fifth reflector, and a fourth lens, the fourth lens disposed between the fourth reflector and the fifth reflector. The fourth reflector is configured to receive the unabsorbed light beam from the wavelength conversion material and to reflect the unabsorbed light beam through the fourth lens and onto the fifth reflector; and the fifth reflector is configured to receive the unabsorbed light beam from the fourth reflector and to reflect the unabsorbed light beam onto the wavelength conversion material to form a first retro reflected light beam.

The apparatus can further comprise: a sixth reflector and a fifth lens, the fifth lens disposed between the wavelength conversion material and the sixth reflector. The wavelength conversion material can be further configured to absorbed a third portion of the first retro reflected light beam and to reflect a fourth portion of the first retro reflected light beam to form a second unabsorbed light beam propagating through the fifth lens and towards the sixth reflector. The sixth reflector can be configured to reflected the second unabsorbed light beam through the fifth lens and onto the wavelength conversion material to form a second retro reflected light beam. The wavelength conversion material can be further configured to absorb a fifth portion of the second retro reflected light beam and to reflect a sixth portion of the second retro reflected light beam to form a third unabsorbed light beam propagating towards the fifth reflector. The fifth reflector can be further configured to reflect the third unabsorbed light beam through the fourth lens and onto the fourth reflector; and the fourth reflector can be further configured to receive the third unabsorbed light beam from the fifth reflector and to reflect the third unabsorbed light beam onto the wavelength conversion material to form a third retro reflected light beam.

One or more of the fourth lens and the fifth lens can comprise a biconvex lens.

BRIEF DESCRIPTION OF THE DRAWINGS

Some implementations of the present specification will now be described, by way of example only, with reference to the attached Figures, wherein.

DETAILED DESCRIPTION

Figure 1:
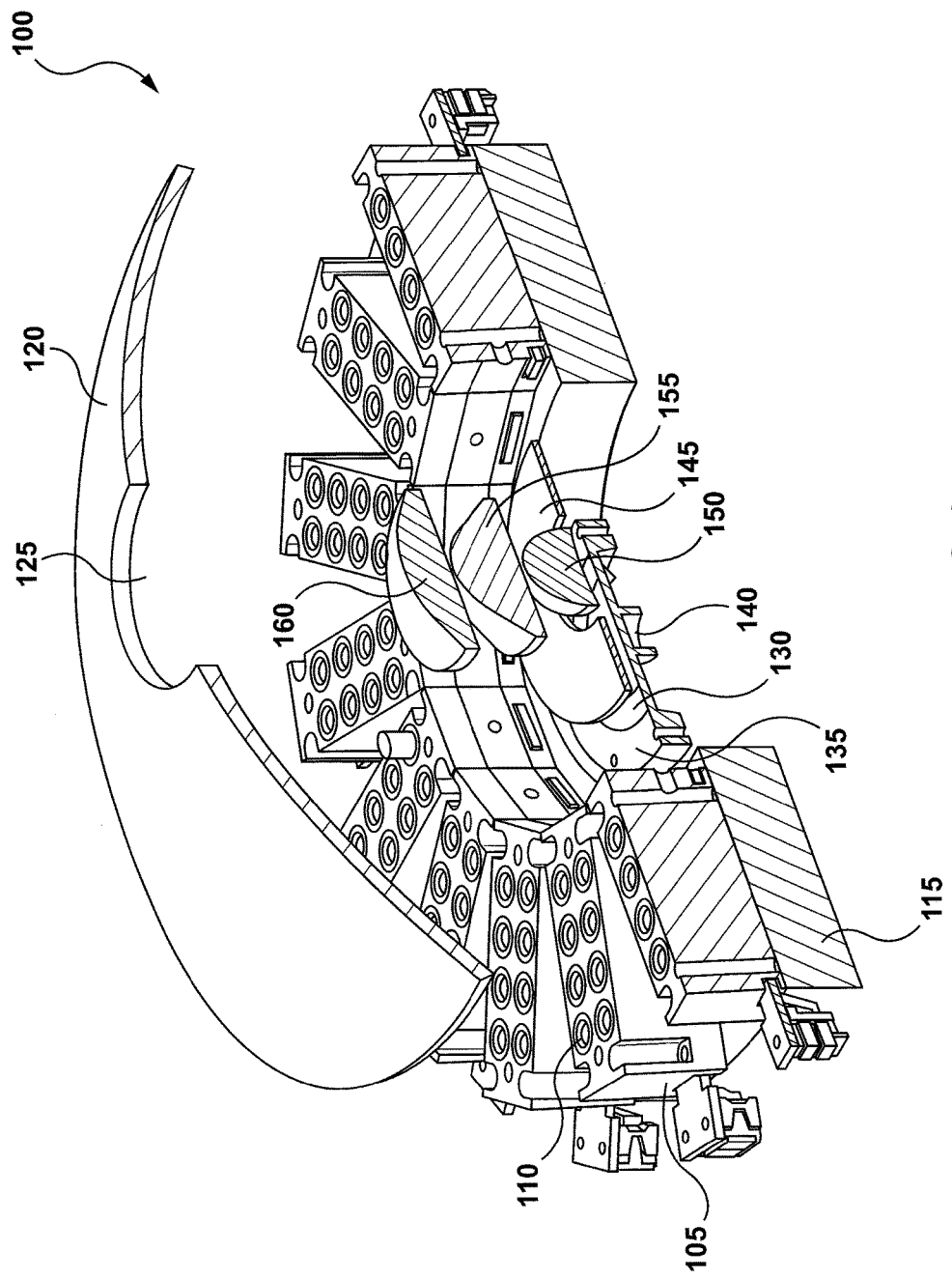
FIG. 1 shows a sectioned perspective view of an apparatus for wavelength conversion, according to non-limiting implementations.

To address the challenges in collecting and directing a large number of input light beams towards a wavelength conversion material while having collection optics positioned very close to the wavelength conversion material, there is provided an apparatus 100 as shown in FIG. 1. FIG. 1 depicts a sectioned perspective view of apparatus 100 to better show the internal components of apparatus 100. Apparatus 100 comprises receiving banks 105 each having a plurality of receiving positions 110, each in turn configured to receive a light source such as a laser diode. The laser diodes are not shown in FIG. 1. Receiving banks 105 are arranged radially on a receiving bank support 115.

Apparatus 100 further comprises a first reflector 120 defining an aperture 125 at or near its center. First reflector 120 has a curvature that is configured to increase the convergence of the input light beams emitted by the laser diodes. Apparatus 100 also comprises a wavelength conversion material 130, which can be deposited on or otherwise supported by wavelength conversion material support 135. Wavelength conversion material 130 can comprise a phosphor, quantum dots, or any other suitable material. In apparatus 100, wavelength conversion material is in the shape of a ring supported on wavelength conversion material support 135. Support 135 can comprise an axle receiving site 140, and can be rotatable about an axle (not shown) receivable in axle receiving site 140. Such rotation can rotate the ring of the wavelength conversion material about the center of the ring.

Wavelength conversion material 130 and wavelength conversion material support 135 can together constitute a wavelength converter. In some implementations, wavelength conversion material 130 alone, i.e. without support 135, can constitute the wavelength converter.

Apparatus 100 also comprises a second reflector 145, a first lens 150, a second lens 155, and a third lens 160. First lens 150, second lens 155, and third lens 160 can comprise the collection optics for collecting at least a portion of the light emitted by wavelength conversion material 130, reducing the divergence of the emitted light, and forming an output light propagating towards aperture 125.

Figure 2:
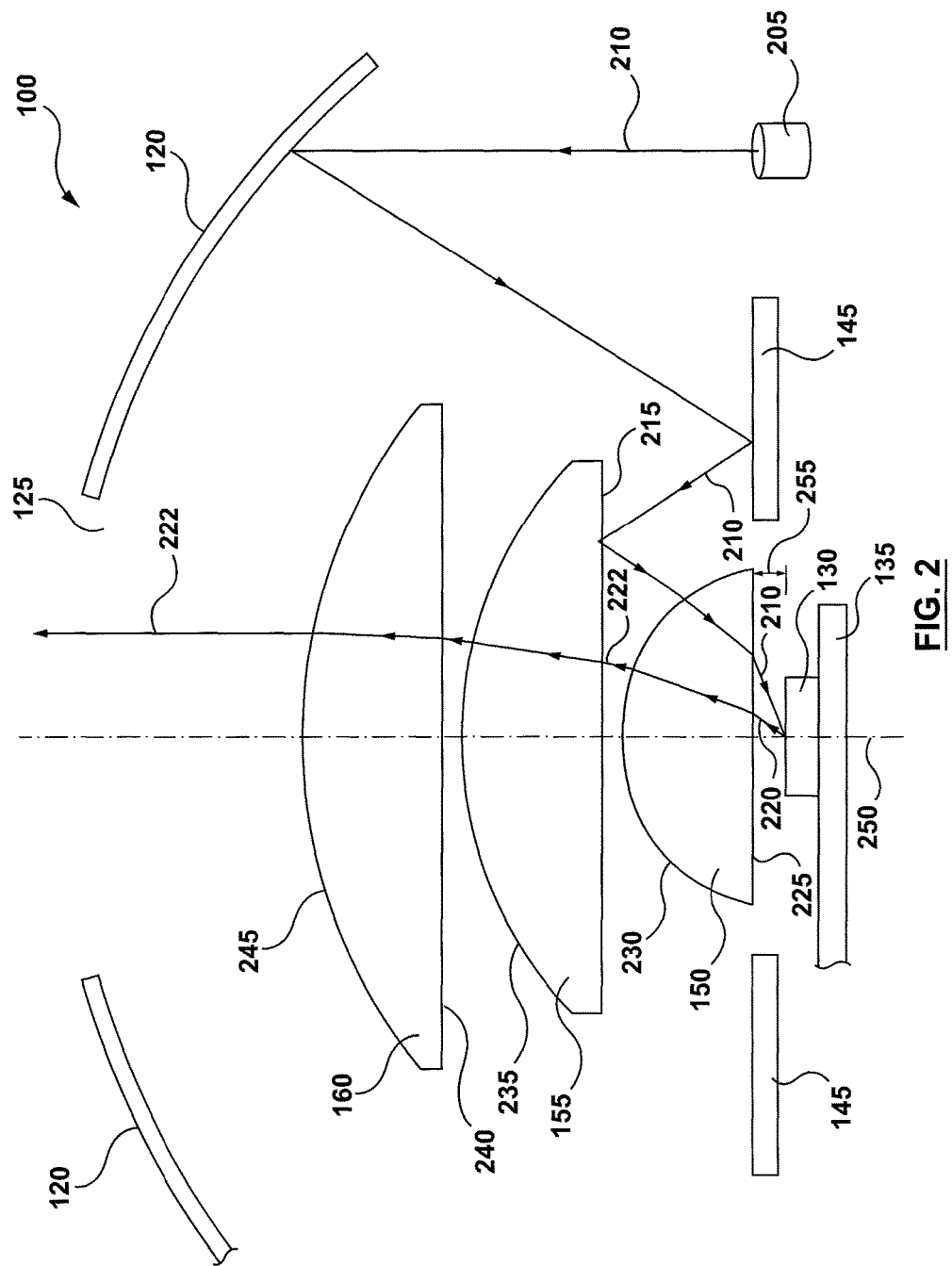
FIG. 2 shows a partial cross-section of the apparatus of FIG. 1.

FIG. 2 depicts a partial cross-section of apparatus 100, and shows the path of an exemplary beam of input light 210 as it travels towards wavelength conversion material 130, which is then excited to emit exemplary emitted light 220. Emitted light 220, in turn, travels through various optical elements towards aperture 125. Input light 210 can be emitted by light source 205, which can be received in a corresponding receiving position 110 in one of the receiving banks 105. Receiving position 110 and receiving bank 105 are not shown in FIG. 2, but are depicted in FIG. 1.

The beam of input light 210 generated by light source 205 propagates towards and is reflected by first reflector 120 towards second reflector 145. Second reflector 145, in turn reflects input light 210 towards flat side 215 of second lens 155. Flat side 215 can be coated with a dichroic coating configured to reflect input light 210. As such, flat side 215 constitutes a third reflector which receives input light 210 from second reflector 145 and reflects input light 210 through first lens 150 and onto wavelength conversion material 130.

Input light 210 excites wavelength conversion material 130 to emit emitted light 220 propagating away from wavelength conversion material 130. Emitted light 220 is wavelength shifted from input light 210; i.e. at least a portion of the wavelength profile of emitted light 220 is shifted towards longer wavelengths (i.e. red-shifted) relative to input light 210. While only one exemplary beam of emitted light 220 is shown in FIG. 2, it is contemplated that emitted light 220 can propagate in a multitude of directions away from wavelength conversion material 130, i.e. emitted light 220 can have a Lambertian profile.

First lens 150 is disposed between the wavelength converter and flat side 215, i.e. the third reflector. First lens 150 comprises a first side 225 and a convex side 230 opposite first side 225. First lens 150 is disposed proximate to wavelength conversion material 130 to receive and/or capture a maximum portion of emitted light 220, which can propagate away from wavelength conversion material 130 in a multitude of directions.

In apparatus 100, first side 225 of first lens 150 is spaced from wavelength conversion material 130 by a gap 255. In some implementations, gap 255 can be in the range of about 0.5 mm to about 4 mm. In other implementations, gap 255 can be in the range of about 1 mm to about 2 mm. In yet other implementations, not shown, there may be no gap between first side 225 and wavelength conversion material 130, i.e. first side 225 of lens 150 can be abutting wavelength conversion material 130.

Exemplary beam of emitted light 220 is received by first lens 150 through first side 225. The shape of first lens 150, i.e. the curvature of first side 225 relative to the curvature of convex side 230 allows first lens 150 to reduce the divergence of emitted light beams received into first lens 150 through first side 225 and transmitted through lens 150 and out of convex side 230. Since FIG. 2 shows only one exemplary beam of emitted light 220, this reduction is divergence is shown as emitted light 220 becoming less divergent from the optical axis 250 of apparatus 100.

The portion of emitted light received by and transmitted through first lens 150 can form an output light 222, which propagates towards flat side 215 (i.e. third reflector) on its way to aperture 125. The dichroic coating of flat side 215 transmits, completely or at least partially, output light 222. Second lens 155 comprises a corresponding convex side 235 opposite flat side 215. The curvature of convex side 235 relative to flat side 215 can allow second lens 155 to reduce the divergence of output light 222 as it enters second lens 155 through flat side 215 and exits second lens 155 through convex side 235. In FIG. 2, this reduction in divergence is shown as a reduction of the divergence of output light 222 from optical axis 250.

Apparatus 100 also comprises third lens 160 which has a corresponding flat side 240 and a corresponding convex side 245 opposite flat side 240. The curvature of convex side 245 relative to flat side 240 can allow third lens 160 to reduce the divergence of output light 222 which enters lens 160 through flat side 240 and exits lens 160 through convex side 245. In FIG. 2, this reduction in divergence is shown as a reduction in the divergence of the exemplary beam of output light 222 from optical axis 250. The combination of first lens 150, second lens 155, and third lens 160 can reduce the divergence of the output light so that the output light more closely approaches collimated light. Output light 222 can emerge from apparatus 100 through aperture 125 in first reflector 120.

FIG. 2 shows first lens 150 as being spaced from second lens 155, which is in turn shown as being spaced from third lens 160. It is contemplated that in other implementations first lens and second lens and/or second lens and third lens may not be spaced from one another and can be abutting one another. The shapes of first lens 150, second lens 155, and third lens 160 are generally configured to reduce the divergence of the output light as it enters first lens 150 and travels through second lens 155 and third lens 160 on its way towards aperture 125. In some implementations, one or more of first lens 150, second lens 155, and third lens 160 can be hemispherical or substantially hemispherical. The possible shapes for first lens 150 will be discussed in greater detail in relation to FIG. 9.

FIG. 2 shows second reflector 145 as being aligned with first side 225 of first lens 150. However, it is contemplated that second reflector 145 can be closer to or further from flat side 215 than shown in FIG. 2. In other words, the distance between second reflector 145 and first side 225 of first lens 150 can be equal to, smaller than, or greater than the distance between wavelength conversion material 130 and first side 225. Second reflector 145 can comprise a mirror, a polished reflective metallic surface, and/or any other suitable reflector. In some implementations, second reflector can be the same as wavelength conversion material support 135, which implementation will be discussed in greater detail in relation to FIG. 7.

First reflector 120 can have a parabolic shape, a stepped shape, a faceted shape, or any other shape suitable for increasing the convergence of the beams of input light 210.

Increasing the convergence can comprise focusing and/or directing the beams of input light 210 towards a focal point or a focal region. The combination of first reflector 120, second reflector 145, third reflector (i.e. flat side 215) and first lens 150 can be configured to converge the beams of input light 210 at the wavelength conversion material 130.

Moreover, while the drawings show first reflector 120 as defining aperture 125, it is contemplated that the first reflector need not have any aperture. In implementations without an aperture in the first reflector, the output light can be directed away from apparatus 100 using additional optical elements such as reflectors, lenses, and any other suitable optical elements placed in the path of the output light.

The use of second reflector 145 and third reflector (i.e. flat side 215) allows input light 210 to pass through only one of three lenses, i.e. first lens 150, on its way to wavelength conversion material 130. Reducing the number of lenses that the input light beam must pass through reduces the distortions and losses that can result from the interactions of the input light beam with lenses. This can, in turn, minimize any distortions of the shape, uniformity, and/or intensity of the input light that is converged on the wavelength conversion material.

As a result of this optical setup which minimizes distortions to the input light, the collection optics can be placed very close to or even abutting the wavelength conversion material without significantly undermining the quality of the input light reaching the wavelength conversion material. Collection optics, e.g. first lens, placed close to or abutting the wavelength conversion material can in turn capture more of the emitted light to form the output light, and therefore can allow the wavelength conversion apparatus to operate at a higher conversion efficiency.

While, as discussed above, reducing the number of lenses that the input light passes through on its way to the wavelength conversion material has certain advantages, it is contemplated that in some implementations (not shown), the input light can pass through both the second lens and the first lens on its way to the wavelength conversion material. In such an implementation, flat side 240 can be coated with the dichroic coating and act as the third reflector instead of flat side 215.

Turning now to the collection lenses, while apparatus 100 is shown as having three lenses, it is contemplated that that the wavelength conversion apparatus can have only the first and second lenses. If the shape of the first and second lenses are not modified from the three-lens implementation, without the third lens beams of output light can be more divergent, i.e. tending less towards being collimated, than would be the case for the three-lens configuration. It is also contemplated that in some implementations, the wavelength conversion apparatus may not have the second and third lenses. Such an apparatus can have only the first lens and a differential reflector, e.g. a dichroic mirror, in the place of flat side 215 of second lens 155. Such an implementation is shown in and will be discussed further in relation to FIG. 8.

As discussed above, in apparatus 100 flat side 215 of second lens 155 is covered with a dichroic coating. In other implementations, other suitable types of differential reflectors can be used, such as a polarizing beam splitter, a photonic crystal, or a Bragg stack. In general, the third reflector is configured to reflect all or substantially all of the input light while transmitting all, substantially all, or at least a portion of the emitted light and/or the output light which are wavelength-shifted from the input light.

While FIGS. 1 and 2 show flat side 215 as being flat, it is contemplated that in some implementations (not shown), the side of the second lens through which the output light enters the second lens can be partially or fully concave. This concavity can more tightly converge the input light onto wavelength conversion material 130. Similarly, in some implementations (not shown), the side of the third lens through which the output light enters the third lens can also be partially or fully concave.

Turning now to light sources 205, they can comprise any suitable light source including but not limited to solid-state sources such laser diodes, fluorescent light sources, electroluminescent light sources, and incandescent light sources. As discussed above, FIG. 1 shows apparatus 100 as comprising a number of receiving banks 105 to receive light sources such as light source 205. While FIG. 1 shows several two-by-four receiving banks 105 arranged radially on receiving bank support 115, it is contemplated that the receiving banks can be of any suitable shape and/or capacity, and they can be arranged in any suitable manner on receiving bank support 115.

Receiving bank support can act as a common plane or surface for aligning and supporting the light sources. In addition, one or more of the receiving banks 105 and the receiving bank support 115 can be configured to act as heat sinks, can be actively cooled, and/or can be thermally coupled to a passive and/or an actively-cooled heat sink For example, receiving bank support 115 can comprise, or be thermally coupled to, a passive or an actively-cooled heat sink, and can be used to cool the receiving banks 105 and the light sources received therein.

In some implementations, the wavelength conversion apparatus may not have any receiving banks and the light sources can be received directly into and/or on a common support such as the receiving bank support 115. In some implementations, the light sources can be positioned such that the input light beams propagating form the light sources towards the first reflector are parallel or substantially parallel to one another. Securing the plurality of the light sources to a common plane, either directly or indirectly using receiving banks, can facilitate both cooling and aligning of the light sources.

Turning now to the wavelength conversion material support 135 shown in FIG. 1, this support 135 can comprise, and/or can be thermally coupled to, a passive heat sink and/or an actively-cooled heat sink. This can facilitate dissipation of heat from wavelength conversion material 130. In addition, rotating the ring-shaped wavelength conversion material 130 about the center of the ring (i.e. about axle receiving site 140) can further distribute the thermal energy from the input light spatially across the ring of the wavelength conversion material thereby reducing thermal concentration and localize heating of the wavelength conversion material.

Figure 3:
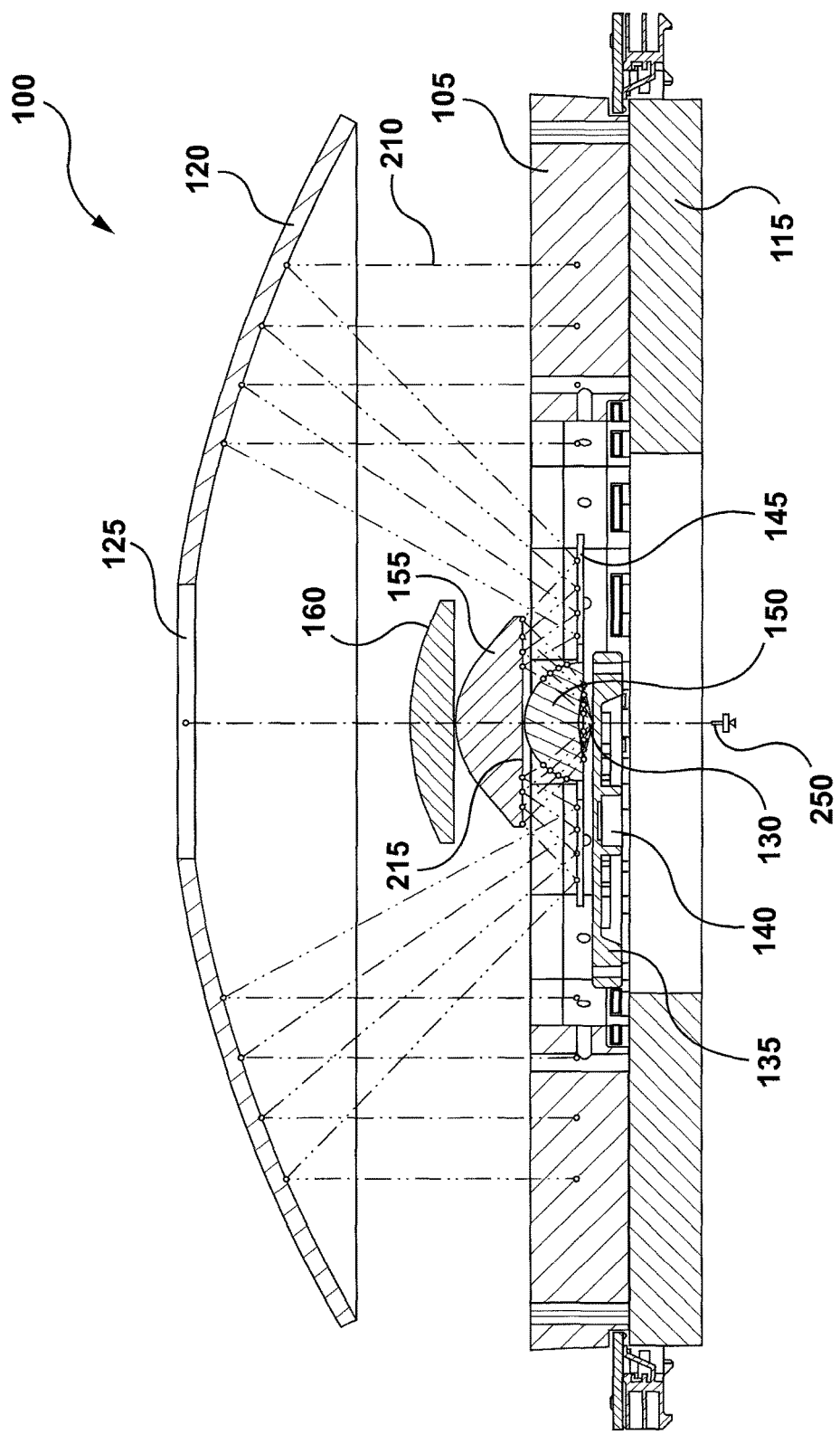
FIG. 3 shows a full cross-section of the apparatus of FIG. 1.

Turning now to FIG. 3, a full cross-section of apparatus 100 is shown. FIG. 3 depicts a plurality of parallel beams of input light 210 propagating from light sources (not shown) received in receiving banks 105. Beams of input light 210 propagate towards first reflector 120 which reflects the input light towards second reflector 145 while also increasing the convergence of the reflected beams of input light 210. Input light 210 then is reflected from second reflector 145 onto the third reflector (i.e. flat side 215), which in turn reflects the input light through first lens 150 and towards wavelength conversion material 130.

Figure 4:
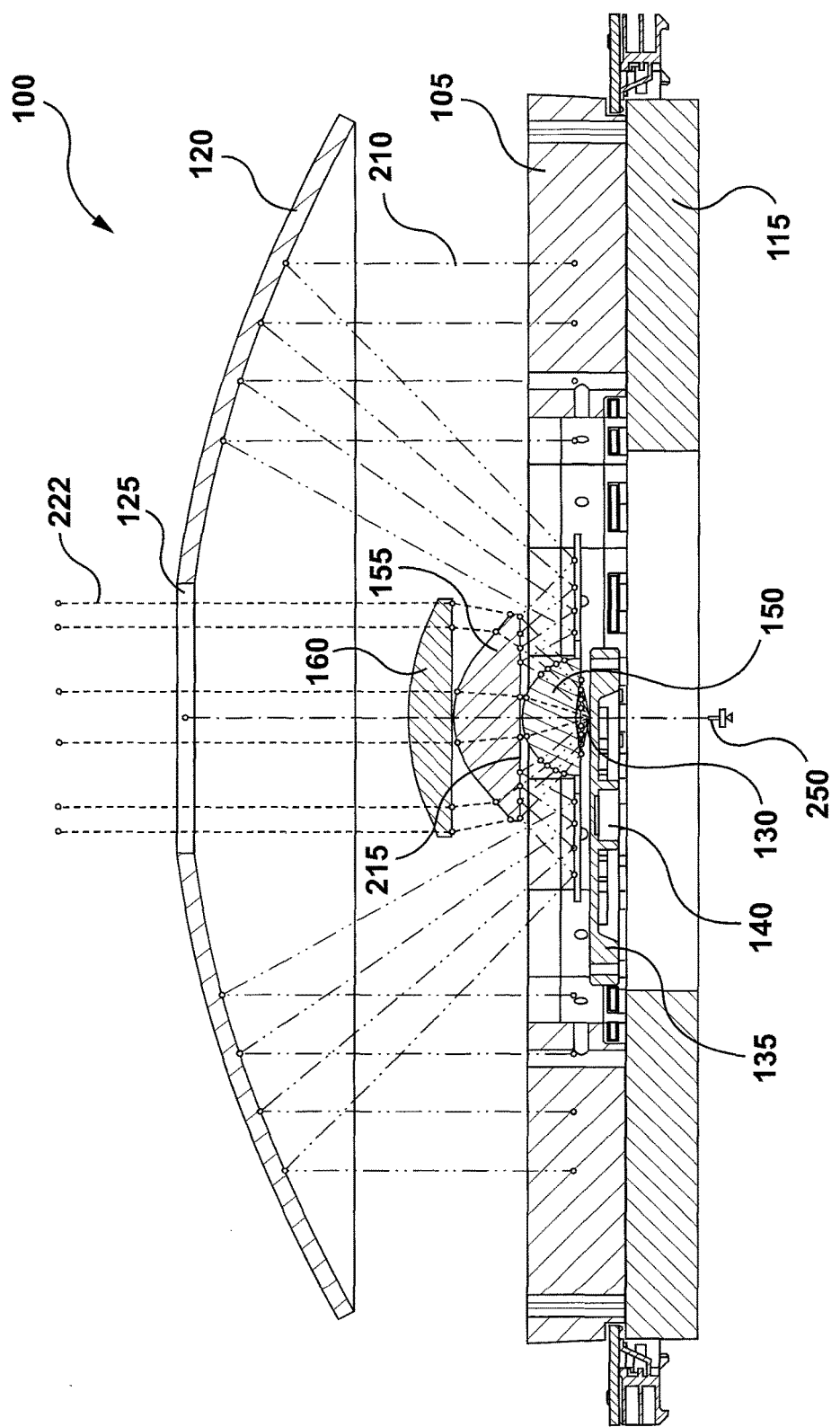
FIG. 4 shows a full cross-section of the apparatus of FIG. 1.

FIG. 4 also depicts a full cross-section of apparatus 100, showing the beams of output light 222 which are collected by first lens 150 and conditioned by first lens 150, second lens 155, and third lens 160. The conditioning comprises reducing the divergence of the beams of output light 222 and/or to substantially or fully collimate output light 222. Output light 222 then emerges from apparatus 100 through aperture 125.

Figure 5:
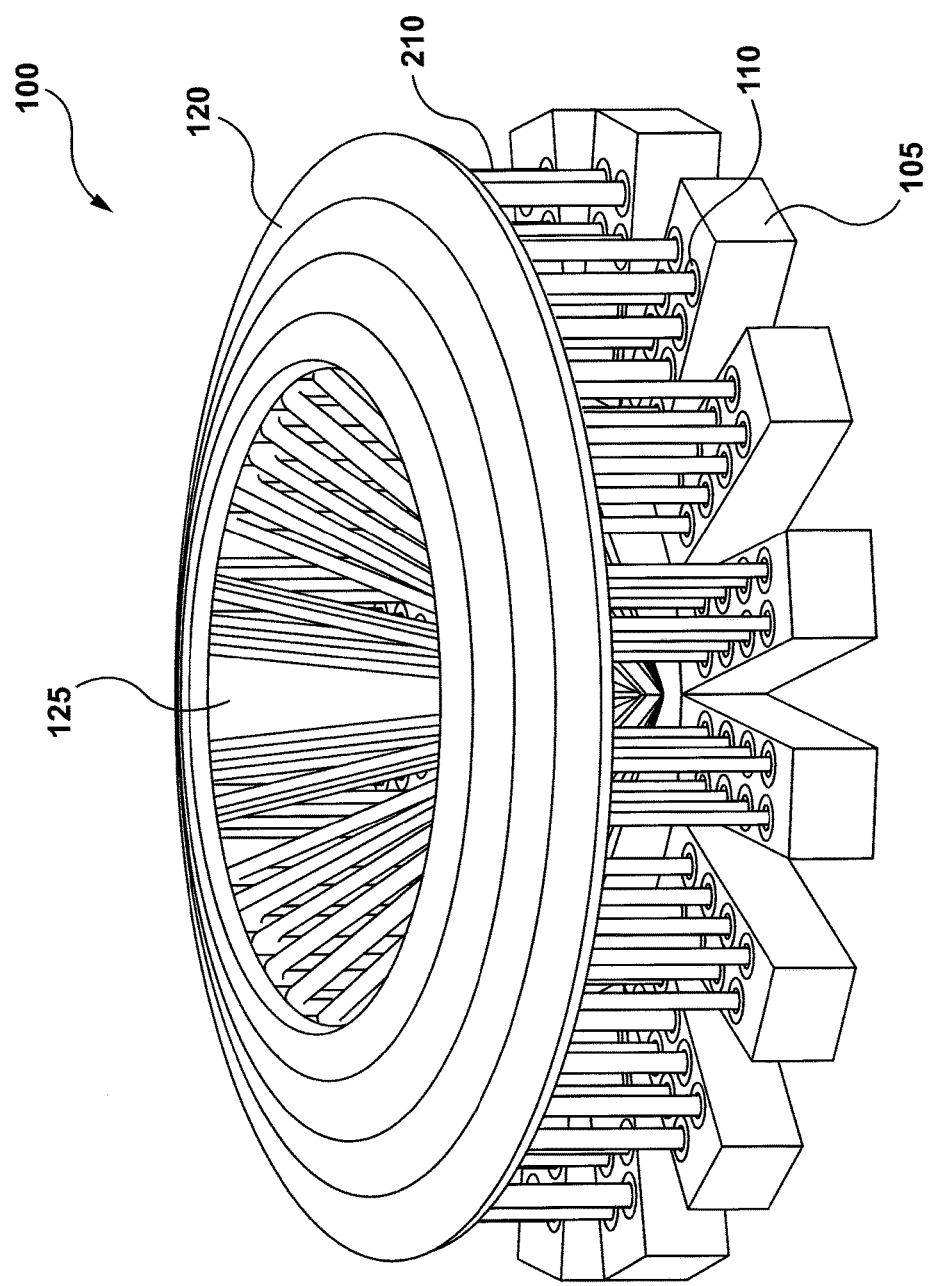
FIG. 5 shows a perspective view of a rendering of the apparatus of FIG. 1, with several components omitted for clarity of illustration.

FIG. 5 shows a perspective view of a rendering of apparatus 100 showing the plurality of beams of input light 210 propagating from receiving banks 105 and reflecting from first reflector 120. In FIG. 5, the collection optics (i.e. first, second, and third lenses), the receiving bank support, and the wavelength conversion material are not shown, for clarity of illustration.

Figure 6:
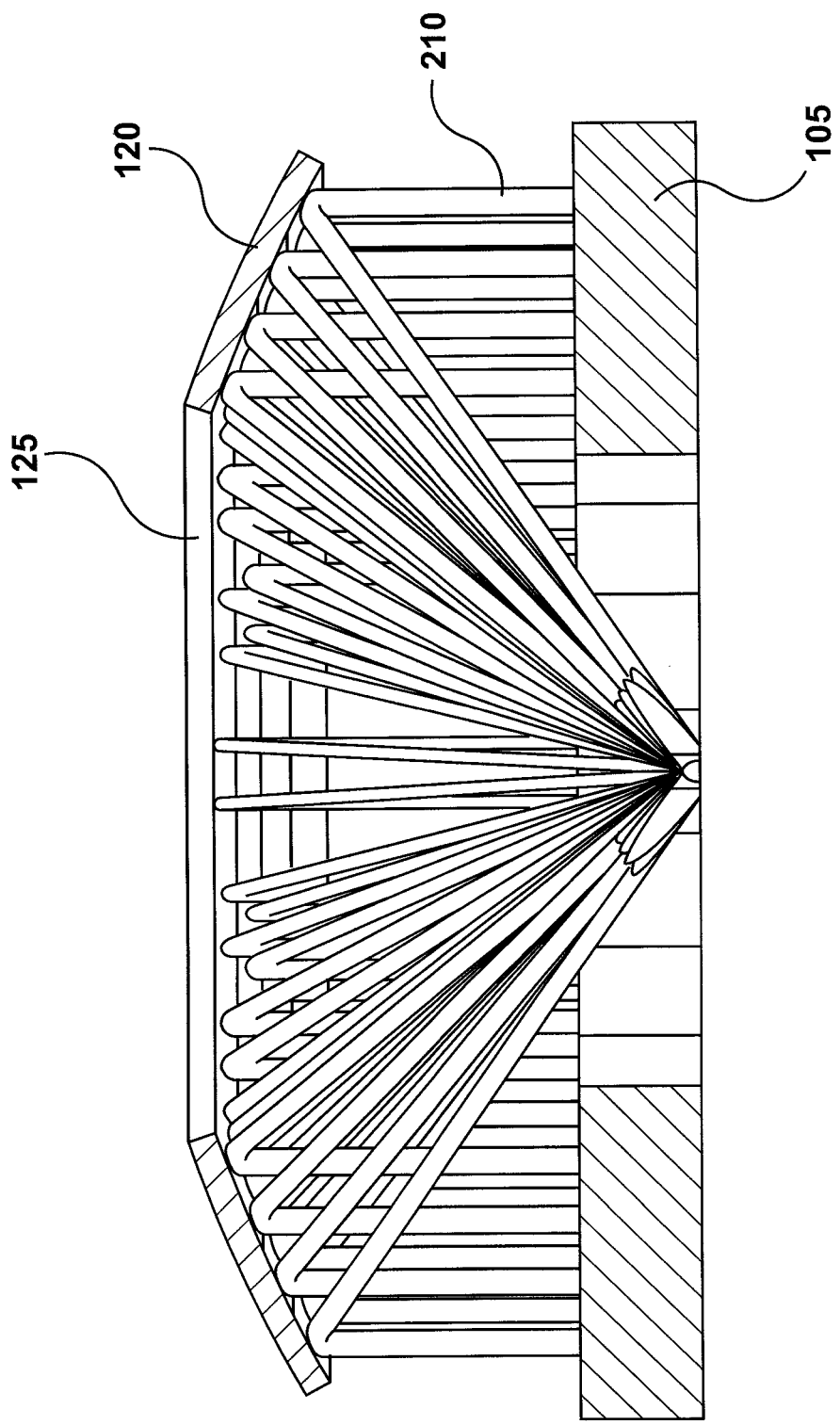
FIG. 6 shows a cross-section of the rendering of FIG. 5.

FIG. 6 shows a cross section of the rendering of apparatus 100 shown in FIG. 5. FIG. 6 shows that the curvature of first reflector 120 increases the convergence of the beams of input light 210 that are reflected from first reflector 120. Similar to FIG. 5, in FIG. 6 the collection optics, the receiving bank support, and the wavelength conversion material are not shown, for clarity of illustration.

Figure 7:
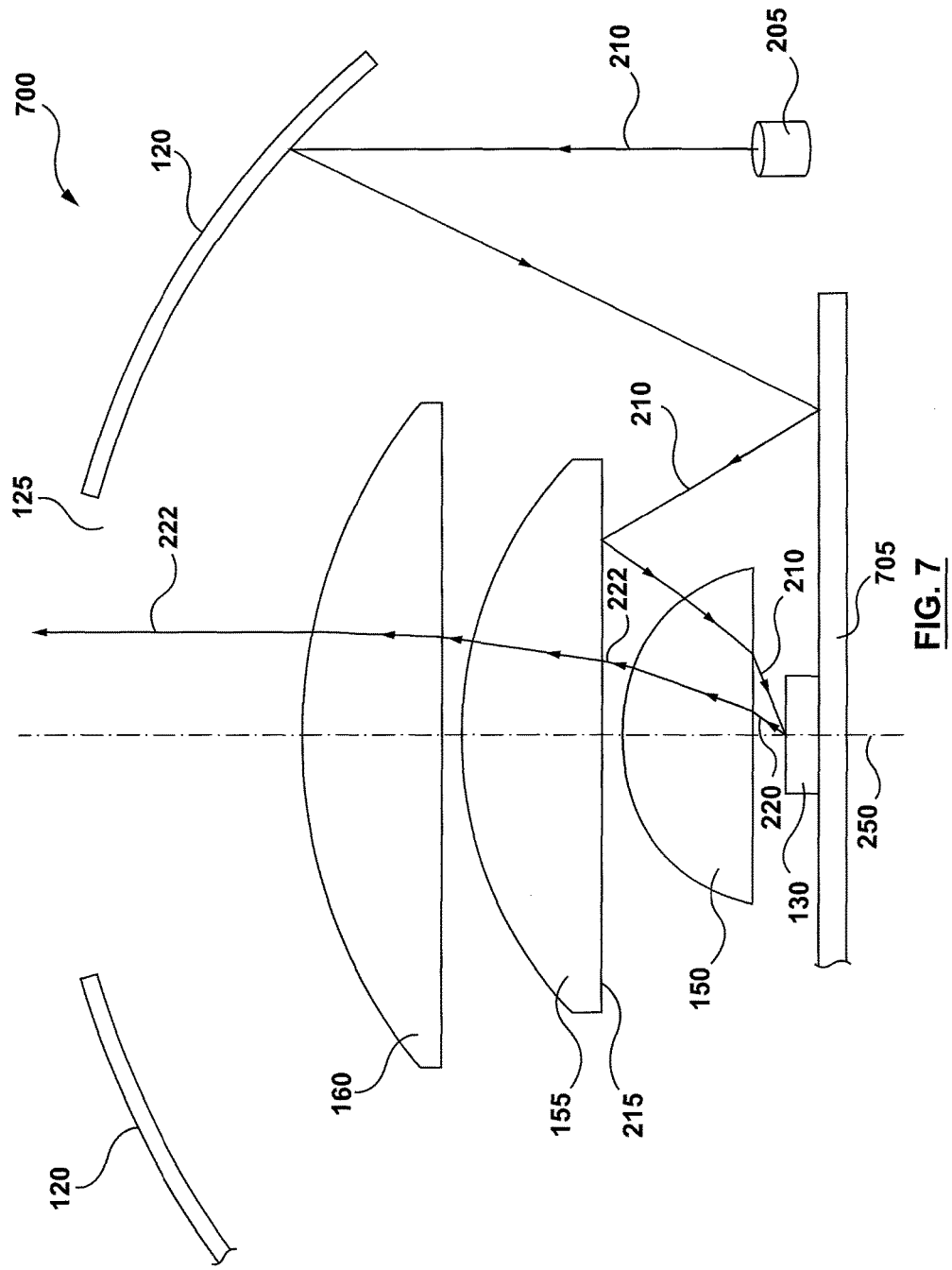
FIG. 7 shows a partial cross-section of another apparatus for wavelength conversion, according to non-limiting implementations.

FIG. 7 shows a partial cross-section of another implementation of the wavelength conversion apparatus. FIG. 7 shows wavelength conversion apparatus 700 which is generally similar to apparatus 100, with like components being given like numbers. The difference between apparatus 700 and apparatus 100 is that in apparatus 700 there is no second reflector 145. In apparatus 700 wavelength conversion material support 705 acts as the second reflector. Support 705 can comprise polished metal or metal alloys, or any other suitable material.

In implementations where wavelength conversion material is shaped as a ring rotatable about an axis offset from the optical axis 250 (see e.g. FIG. 1) a portion of the ring of the wavelength conversion material can interfere with reflection of some of the beams of input light 210 from support 705. This interference can be at least partly mitigated by adjusting the position, distribution, and/or alignment of light sources 205 on receiving bank support 115 (not shown in FIG. 7) to reduce the number of the beams of input light 210 that reflect off of first reflector 120 onto portions of support 705 that are covered by wavelength conversion material 130.

Figure 8:
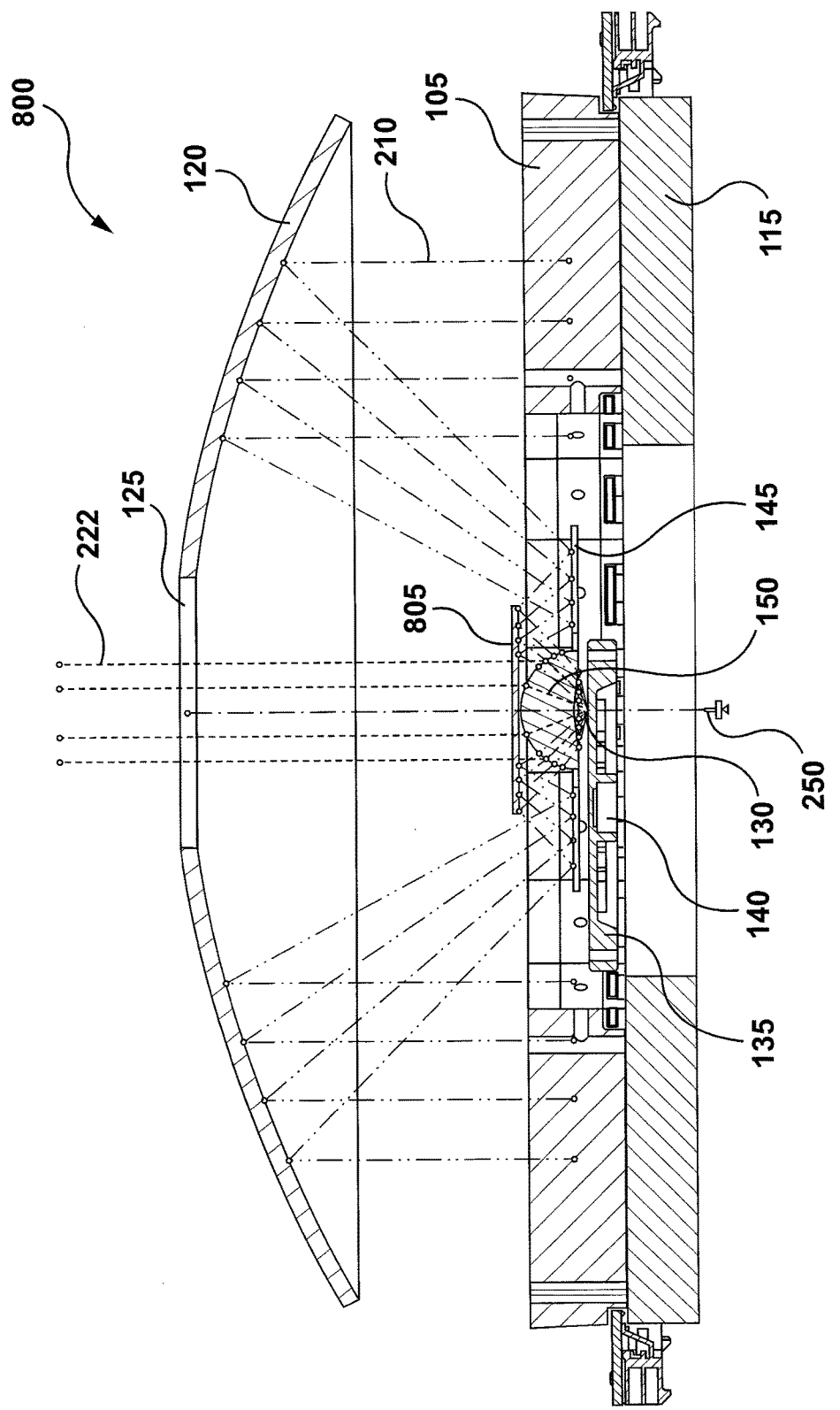
FIG. 8 shows a full cross-section of yet another apparatus for wavelength conversion, according to non-limiting implementations.

FIG. 8 shows a cross-section of yet another implementation of the wavelength conversion apparatus. FIG. 8 shows wavelength conversion apparatus 800 which is generally similar to apparatus 100, with like components being given like numbers. The difference between apparatus 800 and apparatus 100 is that in apparatus 800 there are no second and third lenses. As discussed above, apparatus 800 comprises a differential reflector 805 positioned between first lens 150 and aperture 125. Differential reflector 805 can have a function and structure similar to the dichroic-coated flat side 215 of apparatus 100.

Differential reflector 805 receives input light from second reflector 145 and reflects all or substantially all of the received input light 210 through first lens 150 and towards wavelength conversion material 130. As such, differential reflector acts as the third reflector in apparatus 800. Differential reflector 805 also transmits at least a portion of the output light 222 propagating from first lens 150 towards aperture 125.

Depending on the shape and collimating power of first lens 150, the beams of output light 222 can have a different degree of divergence, i.e. different amounts of deviation from being perfectly collimated. If the shape of first lens 150 is the same as the shape of the first lens used in apparatus 100, the absence of the second and third lenses in apparatus 800 can cause the beams of output light 222 to be divergent, i.e. not fully collimated, as they propagate from first lens 150 and differential reflector 805 towards aperture 125.

Figure 9:
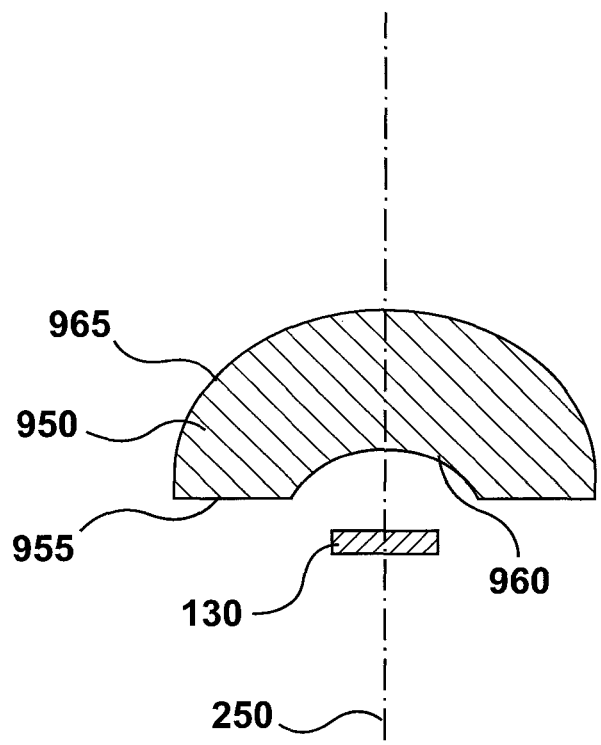
FIG. 9 shows a cross section of a lens used in the apparatus for wavelength conversion, according to non-limiting implementations.

Referring now to FIG. 9, another implementation of the first lens is shown in cross-section. FIG. 9 shows a first lens 950 positioned proximate to wavelength conversion material 130. Optical axis 250 is also shown. First lens 950 can comprise a receiving side that is closer to wavelength conversion material 130 and a convex side 965 opposite the receiving side. The light emitted by the wavelength conversion material 130 enters first lens 950 through all or at least a portion of the receiving side. The receiving side can comprise a flat portion 955 and a concave portion 960. Concave portion 960 can be centered around optical axis 250, with flat portion 955 forming a ring around the periphery of concave portion 960. In some implementations, not shown, the receiving side of first lens 950 can comprise only a concave portion and no flat portion.

Figure 10:
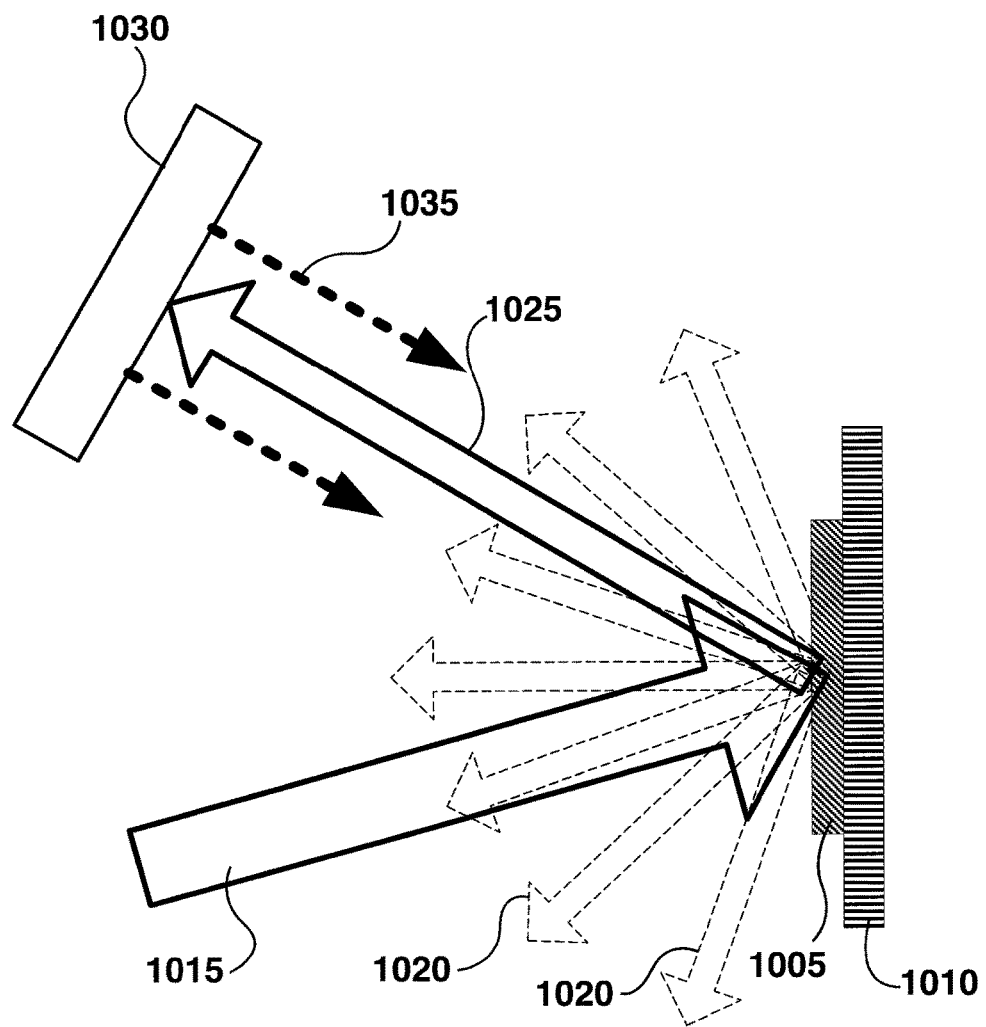
FIG. 10 shows a cross-sectional view of another apparatus for wavelength conversion, according to non-limiting implementations.

Turning now to FIG. 10, and apparatus for wavelength conversion is shown, comprising a wavelength conversion material 1005 disposed on a wavelength conversion material support 1010. Wavelength conversion material 1005 can be similar to wavelength conversion material 130 described above. An input light beam 1015 is incident upon wavelength conversion material 1005 to excite wavelength conversion material 1005 to emit emitted light 1020. Emitted light 1020 can propagate from wavelength conversion material 1005 along a plurality of directions as shown in FIG. 10; for example, emitted light 1020 can have a Lambertian profile.

In order to facilitate heat dissipation from wavelength conversion material 1005, thickness of wavelength conversion material 1005 can be reduced. The thickness of wavelength conversion material 1005 is the dimension measured in a direction normal to wavelength conversion material support 1010. A thinner wavelength conversion material 1005 can be less likely to develop high localized temperatures (because of the improved heat dissipation), which localized high temperatures could damage the wavelength conversion material 1005.

One consequence of such a thinner wavelength conversion material 1005 is that a portion of input light beam 1015 may not be absorbed by wavelength conversion material and can be reflected from wavelength conversion material 1005 to form an unabsorbed light beam 1025. Moreover, wavelength conversion material support 1010 can have a surface that is at least partially reflective, which reflectivity can also contribute to the unabsorbed portion of input light beam 210 being reflected from wavelength conversion material 1005.

The apparatus in FIG. 10 further comprises a retro reflector 1030 to intercept unabsorbed light beam 1025 and reflect it back to form a retro reflected unabsorbed light beam 1035 propagating towards wavelength conversion material 1005. This retro reflection can allow at least some of the energy in unabsorbed light beam 1025 to be used to further excite wavelength conversion material 1005. Arrows shown in FIG. 10 to indicate the various light beams are not intended to show the exact path of each beam, but rather simply indicate the direction of travel of each respective light beam.

Figure 11:
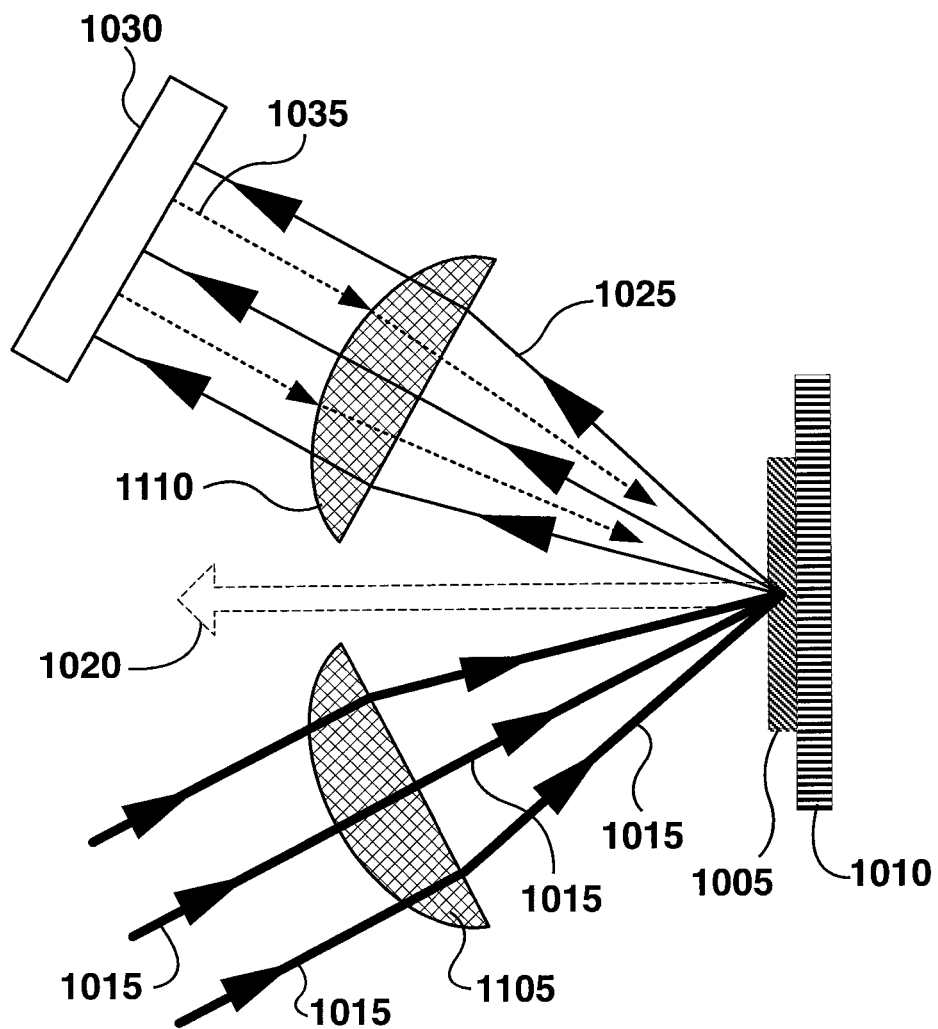
FIG. 11 shows a cross-sectional view of yet another apparatus for wavelength conversion, according to non-limiting implementations.

FIG. 11 shows a wavelength conversion apparatus similar to the apparatus shown in FIG. 10, with like components having like numbers. The apparatus of FIG. 11 is different in that in FIG. 11 a lens 1105 is used to focus input light beams 1015 onto wavelength conversion material 1005. A further lens 1110 is disposed between the wavelength conversion material 1005 and retro reflector 1030. Lens 1110 can be used to focus retro reflected unabsorbed light beams 1035 onto wavelength conversion material 1005.

Figure 12:
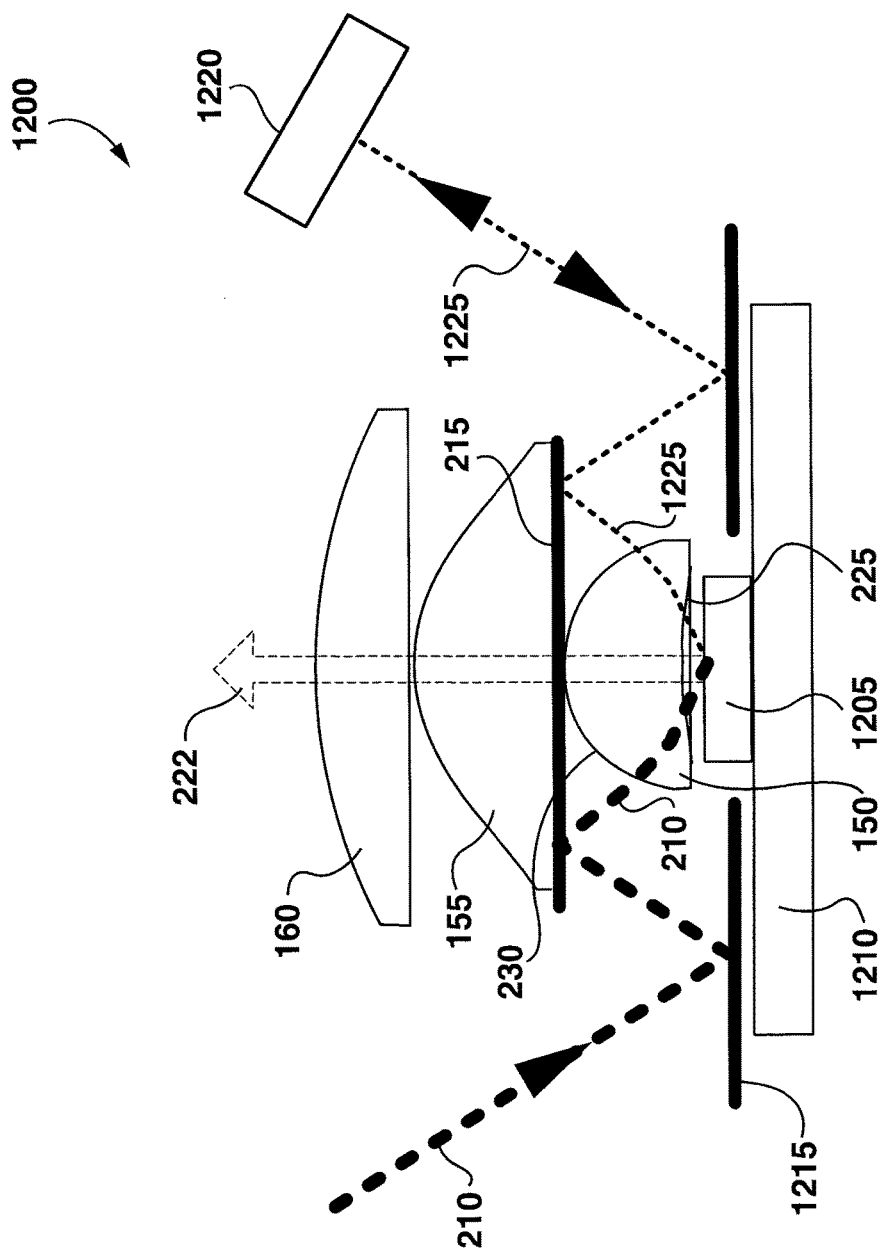
FIG. 12 shows a cross-sectional view of yet another apparatus for wavelength conversion, according to non-limiting implementations.

Turning now to FIG. 12, an apparatus 1200 for wavelength conversion is shown in cross-section. Apparatus 1200 comprises a wavelength conversion material 1205 disposed on a wavelength conversion material support 1210. Wavelength conversion material 1205 can be similar to wavelength conversion materials 130 and 1005. Moreover, wavelength conversion material support 1210 can be similar to wavelength conversion material supports 135 and 1010.

Apparatus 1200 also comprises a base reflector 1215, a differential reflector (i.e. flat side 215 of second lens 155), a first lens 150, and a retro reflector 1220. First lens 150 is disposed between wavelength conversion material 1205 and the differential reflector, i.e. flat side 215. Apparatus 1200 also comprises a second lens 155 and a third lens 160, which together with first lens 150 form a three-lens collection optics as discussed above, for example in relation to FIG. 2. This collection optics is configured to collect the emitted light emitted by wavelength conversion material 1205, and to reduce the divergence of the emitted light to produce an output light 222.

In operation, base reflector 1215 reflects input light beam 210 onto the differential reflector (i.e. flat side 215), which in turn reflects input light beam 210 through first lens 150 and onto wavelength conversion material 1205. "Input light beam" is used interchangeably with "input light", and refers to the beam of input light 210 that is generated by a light source to excite the wavelength conversion material. Wavelength conversion material 1205 absorbs a first portion of input light beam 210, becomes excited, and emits an emitted light. At least a portion of the emitted light is received by first lens 150 of the three-lens collection optics, which optics reduces a divergence of the portion of emitted light to form output light 222. The differential reflector is configured to at least partially transmit output light 222.

A second portion of input light beam 210 is not absorbed by wavelength conversion material 1205, and is reflected by wavelength conversion material 1205 to form an unabsorbed light beam 1225. Unabsorbed light beam 1225 propagates from wavelength conversion material 1205, through first lens 150, and towards the differential reflector. The differential reflector, in turn, reflects unabsorbed light beam 1225 onto base reflector 1215, which in turn reflects unabsorbed light beam 1225 onto retro reflector 1220.

The path of unabsorbed light beam from wavelength conversion material 1205, through first lens 50, onto the differential reflector (i.e. flat side 215), then onto baser reflector 1215, and then onto retro reflector 1220 defines an unabsorbed light path. This unabsorbed light path spans between wavelength conversion material 1205 and retro reflector 1220, while passing through first lens 150 and reflecting from the differential reflector and base reflector 1215.

Once unabsorbed light beam 1225 reaches retro reflector 1220, retro reflector 1220 reflects unabsorbed light beam back along the unabsorbed light path towards wavelength conversion material 1205. This can allow for recycling of unabsorbed light beam 1225 so that it can be redirected onto wavelength conversion material 1205 to further excite wavelength conversion material 1205 to emit light.

The recycling of unabsorbed light beam 1225 can increase the efficiency of apparatus 1200 by allowing more of the energy of input light beam 210 to be absorbed by wavelength conversion material 1205 and used to generate emitted light. While, placing first lens 150, and the collection optics of which the first lens forms a part, close to wavelength conversion material 1205 can allow for maximizing the portion of the emitted light that can be collected/received by the collection optics, the collection optics can interfere with input light beam 210 and with recycling and retro reflecting unabsorbed light beam 1225. The use of base reflector 1215 and the differential reflector can allow input light beam 210 to be directed onto wavelength conversion material 1205 with reduced interference by the collection optics, i.e. by passing through only first lens 150 of the three lenses 150, 155, 160 of the collection optics.

Moreover, the use of the differential reflector and base reflector 1215 can also allow for reducing the interference of the collection optics with the retro reflection of unabsorbed light beam 1225. That is, the use of differential reflector and base reflector 1215 can shape the unabsorbed light path to pass through only first lens 150 of the three lenses 150, 155, and 160 of the collection optics. The impact of reducing this interference is further increased because unabsorbed light beam 1225 traverses the unabsorbed light path twice, once on its way to retro reflector 1220 and a second time on its way back from retro reflector 1220 towards wavelength conversion material 1205.

Generally, the collection optics comprising first lens 150, second lens 155, and third lens 160 can be similar to the collection optics described above, for example in relation to FIG. 2. As shown in FIG. 12, first lens 150 can have a first side 225 and a convex side 230 opposite first side 225. All or a portion of first side 225 can be concave.

In addition, while FIG. 12 shows apparatus 1200 as having three lenses 150, 155, 160, it is also contemplated that apparatus 1200 can have fewer lenses in its collection optics. For example, it is contemplated that apparatus 1200 can have only first lens 150 or only first lens 150 and second lens 155. Furthermore, it is contemplated that apparatus 1200 can have more than three lenses in its collection optics.

Moreover, while in apparatus 1200 base reflector 1215 and the differential reflector are positioned such that input light beam 210 and unabsorbed light beam 1225 pass though only first lens 150 of the three-lens collection optics, it is contemplated that in other implementations base and differential reflectors can be positioned such that one or more of the input light beam and the unabsorbed light beam can pass through two or more of the lenses of the collection optics.

Furthermore, FIG. 12 shows only one input light beam 210 and one unabsorbed light beam 1225, which is for ease of illustration only: it is contemplated that multiple light beams can be used as the input light, which beams would then generate multiple unabsorbed light beams.

Turing now to the unabsorbed light path, FIG. 12 shows that unabsorbed light beam 1225 follows the same path when propagating from wavelength conversion material 1205 towards retro reflector 1220, as it does when propagating in the reverse direction from retro reflector 1220 towards wavelength conversion material 1205. This is made possible because retro reflector 1220 is oriented to be normal, or substantially normal, to unabsorbed light beam 1225 incident upon it. However, it is also contemplated that in other implementations the unabsorbed light beam need not traverse the same path propagating towards and away from the retro reflector; as a non-limiting example, the unabsorbed light path can traverse a closed loop as it propagates from the wavelength conversion material, towards the retro reflector, and then is reflected by the retro reflector and propagates back towards the wavelength conversion material.

In some implementations, the retro reflector can be oriented at an angle other than 90° to the unabsorbed light beam incident upon it. It is also contemplated that in some implementations, additional optical components can be placed in the unabsorbed light path and/or can be used to define the unabsorbed light path. Examples of these additional optical components include, but are not limited to, lenses, additional reflectors, and the like.

Turning now to the structure and/or function of the differential reflector used in apparatus 1200, this differential reflector can be similar to the differential reflector and/or third reflector described in relation to apparatuses 100, 700, and/or 800 described above. It is contemplated that in some implementations the differential reflector can comprise a reflector separate or independent of any lens; see for example differential reflector 805 shown in FIG. 8. In such an implementation apparatus 1200 may not have a second lens or third lens, or those lenses can be separate from the differential reflector. As such, it is contemplated that the unabsorbed light path can have a shape and/or length that can be different than that shown in FIG. 12.

Turning now to the orientation and/or shape of base reflector 1215 and the differential reflector, it is contemplated that one or more of these reflectors can be positioned or oriented differently than shown in FIG. 12. For example, it is contemplated that in some implementations the distance between the base reflector and the differential reflector (i.e. flat side 215) can be smaller than the distance between wavelength conversion material 1205 and the differential reflector. In addition, while FIG. 12 shows base reflector 1215 as being a flat reflector oriented parallel to wavelength conversion material support 1210 and the differential reflector, it is contemplated that base reflector 1215 can be oriented differently and/or can be shaped to be curved and/or bent. Similarly, it is contemplated that the differential reflector can have an orientation and/or shape that can be different than those shown in FIG. 12; for example, it is contemplated that the differential reflector can be shaped to be curved or bent.

Turning now to retro reflector 1220, it is contemplated that retro reflector 1220 can be positioned and/or oriented differently than shown in FIG. 12. Moreover, it is contemplated that retro reflector 1220 need not be flat and can have a different shape including but not limited to a curved, faceted, stepped, or bent shape.

As shown in FIG. 12, input light beam 210 and unabsorbed light beam 1225 form an angle with base reflector 1215 that is different than 90°. This angle can allow these beams to be reflected towards and/or away from wavelength conversion material 1205 while passing through only first lens 150 of the three-lens collection optics. It is contemplated that the angle of one or more of input light beam 210 and unabsorbed light beam 1225 with base reflector 1215 can be different than the angle shown in FIG. 12. In addition, it is also contemplated that the angle of input light beam 210 with base reflector 1215 can be the same as or different from the angle of unabsorbed light beam 1225 with base reflector 1215.

Referring now to the partial reflection of input light beam 210 from wavelength conversion material 1205 to form unabsorbed light beam 1225, FIG. 12 shows input light beam 210 reflecting from the outer surface of wavelength conversion material 1205. While some or all of the reflection of input light beam 210 can be from the outer surface of wavelength conversion material 1205, it is contemplated that a portion of input light beam 210 can also be reflected by one or more of the inside portion of wavelength conversion material 1205 and by the surface of wavelength conversion material support 1210.

Figure 13:
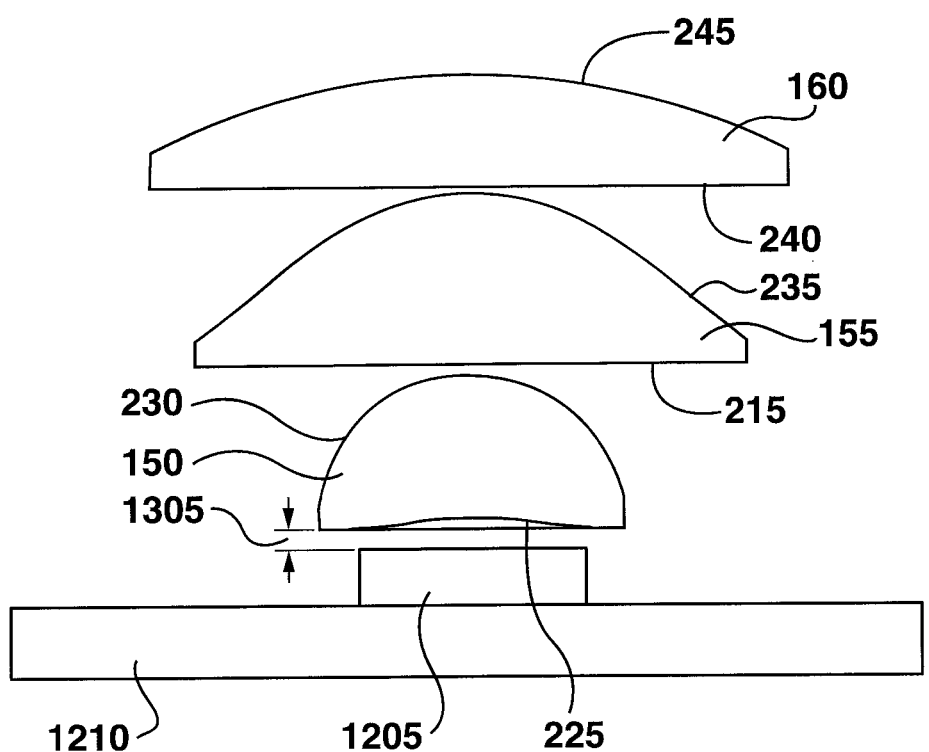
FIG. 13 shows a cross-sectional view of the collection optics of the apparatus of FIG. 12.

Turning now to FIG. 13, a cross-section of the collection optics, wavelength conversion material 1205, and wavelength conversion material support 1210 of apparatus 1200 are shown. FIG. 13 shows that there can be a gap 1305 between first side 225 of first lens 150 and wavelength conversion material 1205. Gap 1305 can be similar to gap 255 described above in relation to FIG. 2. While FIGS. 12 and 13 show a gap between first side 225 of first lens 150 and wavelength conversion material 1205, it is also contemplated that in some implementations, there can be no gap between first side 225 and wavelength conversion material 1205, i.e. lens 150 can be abutting wavelength conversion material 1205.

Figure 14:
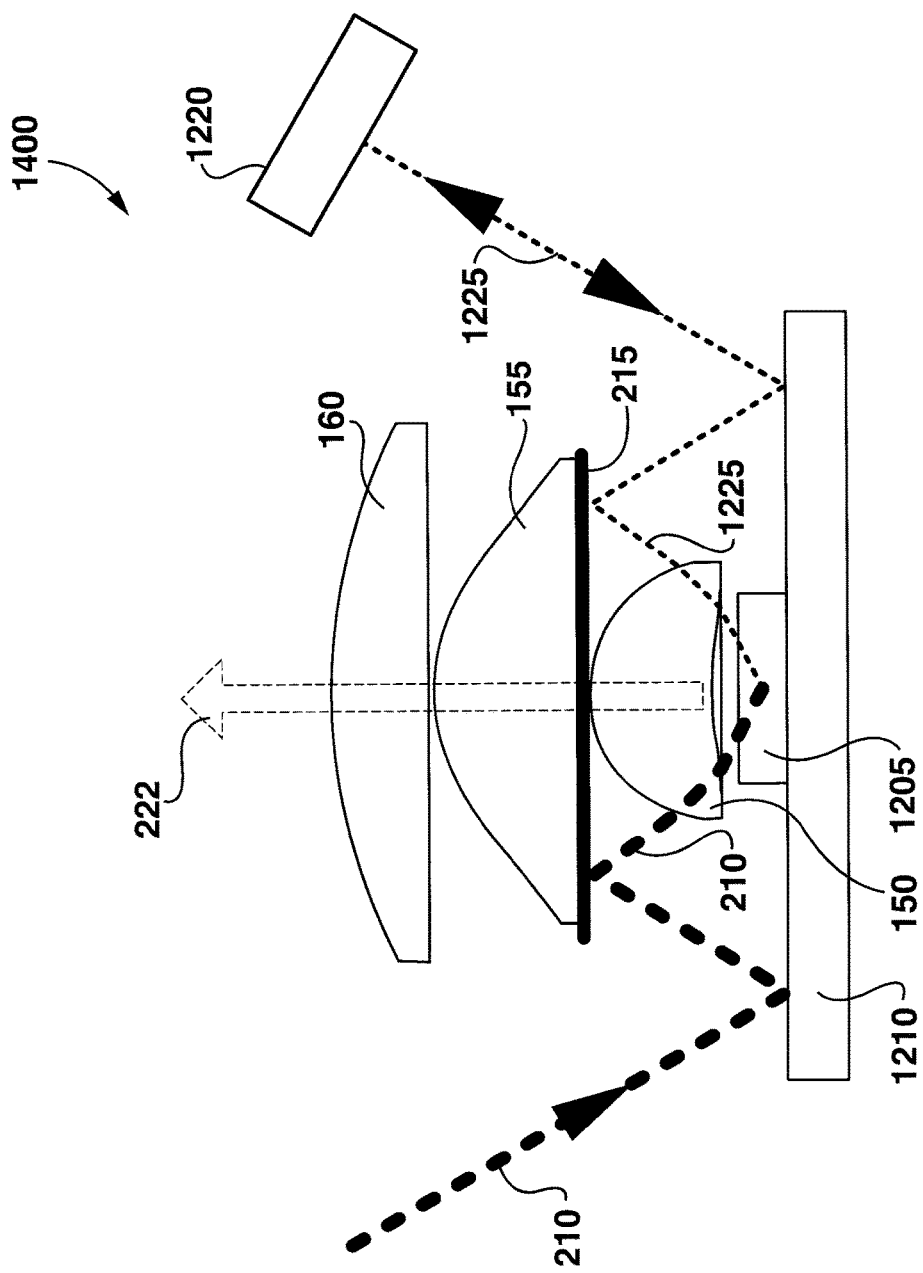
FIG. 14 shows a cross-sectional view of yet another apparatus for wavelength conversion, according to non-limiting implementations.

FIG. 14 shows a cross-section of another apparatus 1400 for wavelength conversion. Apparatus 1400 is similar to apparatus 1200, with like components having like numbers. The difference between apparatus 1400 and apparatus 1200 is that apparatus 1400 does not comprise a separate base reflector 1215. In apparatus 1400, wavelength conversion material support 1210 comprises a reflective surface (on a portion of which wavelength conversion material 1205 is deposited) which reflective surface acts as the base reflector to reflect input light beam 210 onto differential reflector (i.e. flat side 215) and to reflect unabsorbed light beam 1225 onto retro reflector 1220.

Figure 15:
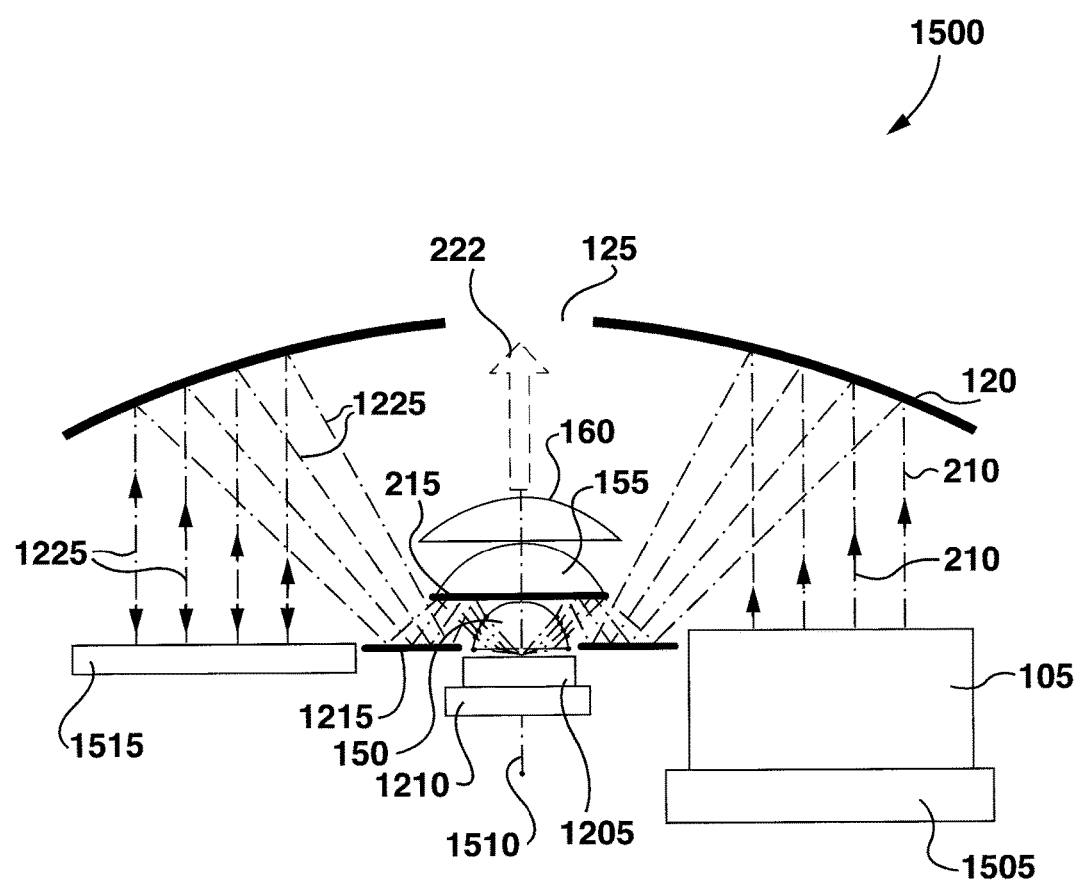
FIG. 15 shows a cross-sectional view of yet another apparatus for wavelength conversion, according to non-limiting implementations.

FIG. 15 shows a cross-section of another apparatus 1500 for wavelength conversion. Apparatus 1500 comprises a wavelength conversion material on a support, a base reflector, a differential reflector, and collection optics similar to apparatus 1200, with like components having like numbers. The primary difference between apparatus 1500 and apparatus 1200 is that apparatus 1500 comprises first reflector 120, and a retro reflector 1515 instead of retro reflector 1220 of apparatus 1200.

First reflector 120 can be similar to the first reflector described in relation to apparatus 100. In apparatus 1500, one or more input light beams 210 can be generated by one or more corresponding light sources (not shown) received in receiving bank 105. Receiving bank 105 can also be similar to those described in relation to apparatus 100. First reflector is positioned to intercept input light beams 210 and to reflect them onto base reflector 1215. The shape of first reflector 120 is configured to increase a convergence of input light beams 210 reflected from first reflector 120.

Input light beams 210 are then reflected from base reflector 1215 onto differential reflector (i.e. flat side 215), which in turn reflects input light beams 210 through fist lens 150 and onto wavelength conversion material 1205. A first portion of input light beams 210 is absorbed by wavelength conversion material 1205 and excites it to emit an emitted light, which emitted light is at least partially received by the collection optics (i.e. lenses 150, 155, and 160) to form output light 222.

A second portion of input light beams 210 reflects from wavelength conversion material 1205 to form unabsorbed light beams 1225. First lens 150 receives unabsorbed light beams 1225 and transmits them towards the differential reflector, which in turn reflects unabsorbed light beams 1225 onto base reflector 1215. Next, base reflector 1215 reflects unabsorbed light beams 1225 onto first reflector 120, which then reflects unabsorbed light beams onto a retro reflector 1515.

Apparatus 1500 defines an unabsorbed light path extending from wavelength conversion material 1205, through first lens 150, onto the differential reflector, onto base reflector 1215, onto first reflector 120, and onto retro reflector 1515. Once unabsorbed light beams 1225 reach retro reflector 1515, they are reflected back along the unabsorbed light path towards wavelength conversion material 1205. Since there can be multiple unabsorbed light beams 1225 in apparatus 1500, each unabsorbed light beam 1225 can have a slightly different unabsorbed light path, all of which paths are defined by the same optical components namely wavelength conversion material 1205, first lens 150, the differential reflector, base reflector 1215, first reflector 120, and retro reflector 1515. The discussion herein will use "unabsorbed light path" to refer to each of these unabsorbed light paths individually and to the unabsorbed light paths collectively.

It is contemplated that in other implementations the unabsorbed light path can have a shape and/or length that is different from those shown in FIG. 15. For example, the optical components that define the unabsorbed light path can be in different positions and/or orientations, and/or additional optical elements can be positioned in the unabsorbed light path. It is also contemplated that in some implementations the unabsorbed light path can comprise a closed loop instead of having unabsorbed light beams 1225 traversing the same light path when propagating towards and away from retro reflector 1515.

Turning now to retro reflector 1515, while FIG. 15 shows retro reflector 1515 as being co-planar with base reflector 1215, it is contemplated that in other implementations retro reflector 1515 can be in a different position and/or orientation; for example, and without limitation, retro reflector 1515 can be closer to or further from first reflector 120 than base reflector 1215. In some implementations, retro reflector 1515 can be in an orientation other than being parallel with base reflector 1215. In some implementations, retro reflector 1515 can have a shape other than a flat plate, including but not limited to being curved, faceted, stepped, or bent.

First reflector 120 can also be curved, faceted, or stepped. In some implementations, first reflector 120 can be parabolic. The combination of first reflector 120, base reflector 1215, the differential reflector, and first lens 150 can be configured to converge both input light beams 210 and the retro reflected unabsorbed light beams 1225 at wavelength conversion material 1205. Moreover, in some implementations first reflector 120 can define an aperture 125 for passage of output light 222.

As shown in FIG. 15, in some implementations the light sources (not shown) emitting input light beams 210 can be received in a receiving bank 105. In some implementations, receiving bank 105 can be disposed on, or otherwise thermally coupled to, a cold plate 1505. Furthermore, in some implementations, first reflector 120 can have a shape that is rotationally symmetrical about an optical axis 1510 of apparatus 1500. In such an implementation, retro reflector 1515 can be positioned diametrically opposite (relative to optical axis 1510) receiving bank 105 to allow retro reflector 1515 to receive and reflect unabsorbed light beams 1225 that are generated by input light beams 210 emitted by light sources (not shown) received in receiving bank 105. The positioning of the retro reflectors will be further described in relation to FIGS. 16-18.

Figure 16:
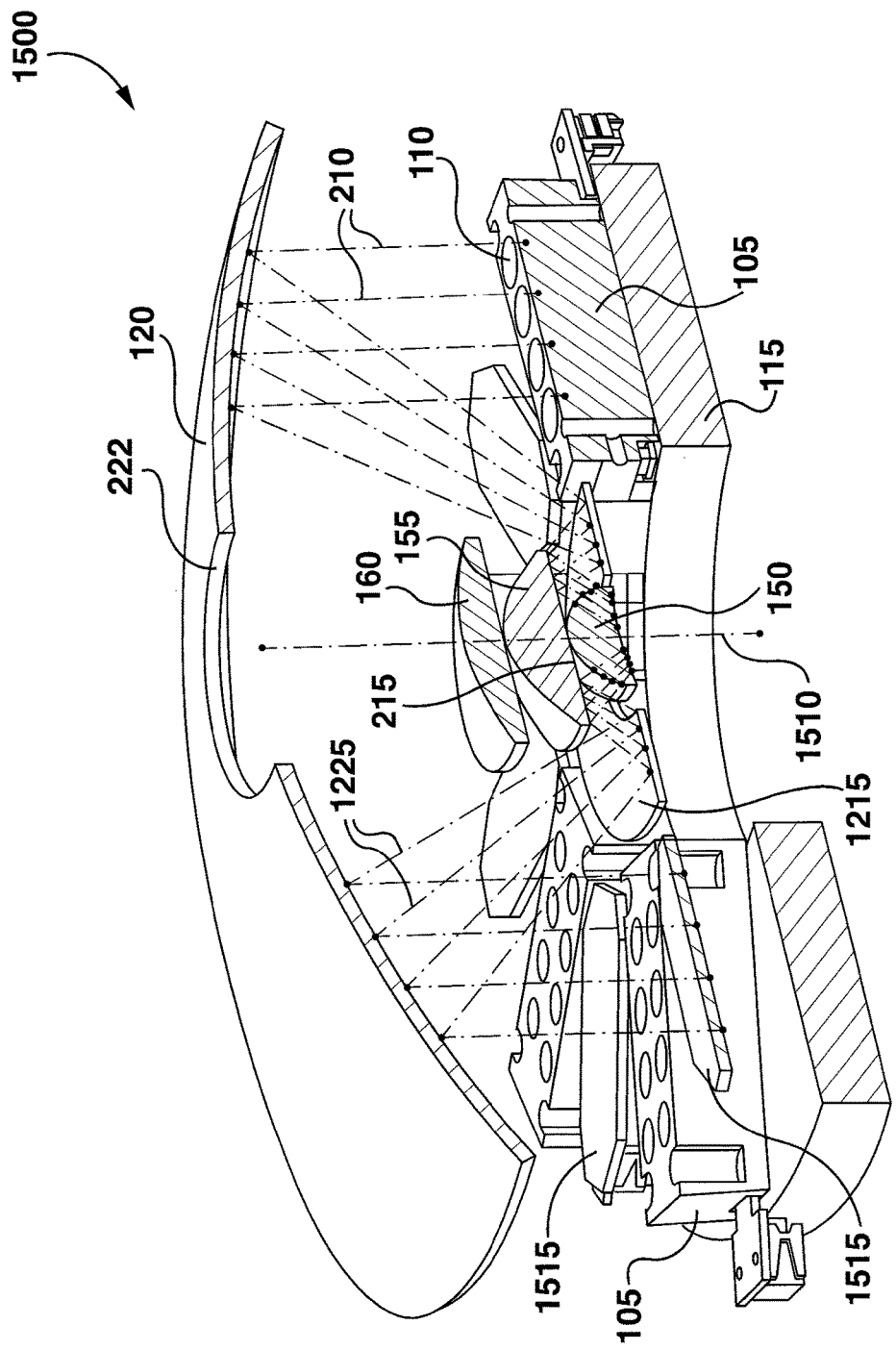
FIG. 16 shows a sectioned top perspective view of the apparatus of FIG. 15.

FIG. 16 shows a sectioned top perspective view of apparatus 1500. FIG. 16 shows that receiving banks 105 can be disposed on a receiving bank support 115. While FIG. 15 shows cold plate 1505 instead of receiving bank support 115, it is contemplated that apparatus 1500 can comprise either receiving bank support 115 and/or cold plate 1505. In some implementations, receiving bank support 115 can comprise, and/or can be thermally coupled to, a cold plate such as cold plate 1505 shown in FIG. 15. While for ease of illustration FIG. 16 does not show the coupling of retro reflectors 1515 to receiving bank support 115, it is contemplated that retro reflectors 1515 can be secured to receiving bank support 115 using any suitable means known in the art.

Moreover, while FIG. 16 shows receiving banks 105 having a 2×4 array of receiving positions 110, it is contemplated that receiving banks 105 can have any other shape and/or array size of receiving positions. Similarly, it is contemplated that retro reflectors 1515 can have any other suitable shape and/or size. FIG. 16 shows receiving bank support 115 as comprising an annular member with receiving banks 105 and retro reflectors 1515 disposed radially on the annular member. Furthermore, FIG. 16 shows an alternating arrangement of receiving banks 105 and corresponding retro reflectors 1515, with a retro reflector 1515 diametrically opposite (relative optical axis 1510) of each corresponding receiving bank 105.

Figure 17:
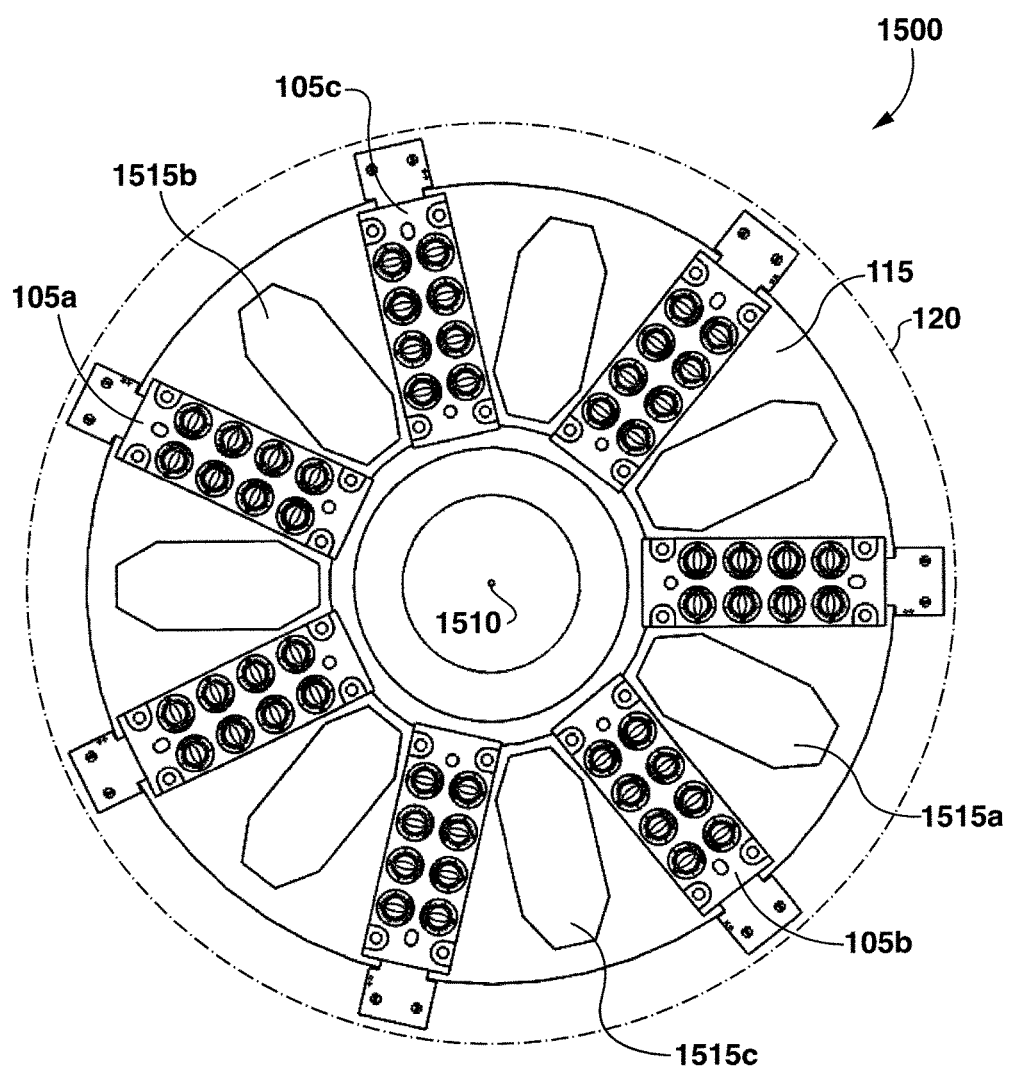
FIG. 17 shows a top plan view of the apparatus of FIG. 15.

FIG. 17 shows a top plan view of apparatus 1500, while depicting first reflector 120 in a see-through manner to show the components that would otherwise be obscured by first reflector 120. FIG. 17 shows the alternating arrangement of retro reflectors and receiving banks. In addition, FIG. 17 shows that each receiving bank is disposed on receiving bank support 115 diametrically opposite (relative optical axis 1510) of a corresponding retro reflector; for example, receiving bank 105a is diametrically opposite retro reflector 1515a, and similarly receiving banks 105b and 105c are diametrically opposite retro reflectors 1515b and 1515c respectively.

Figure 18:
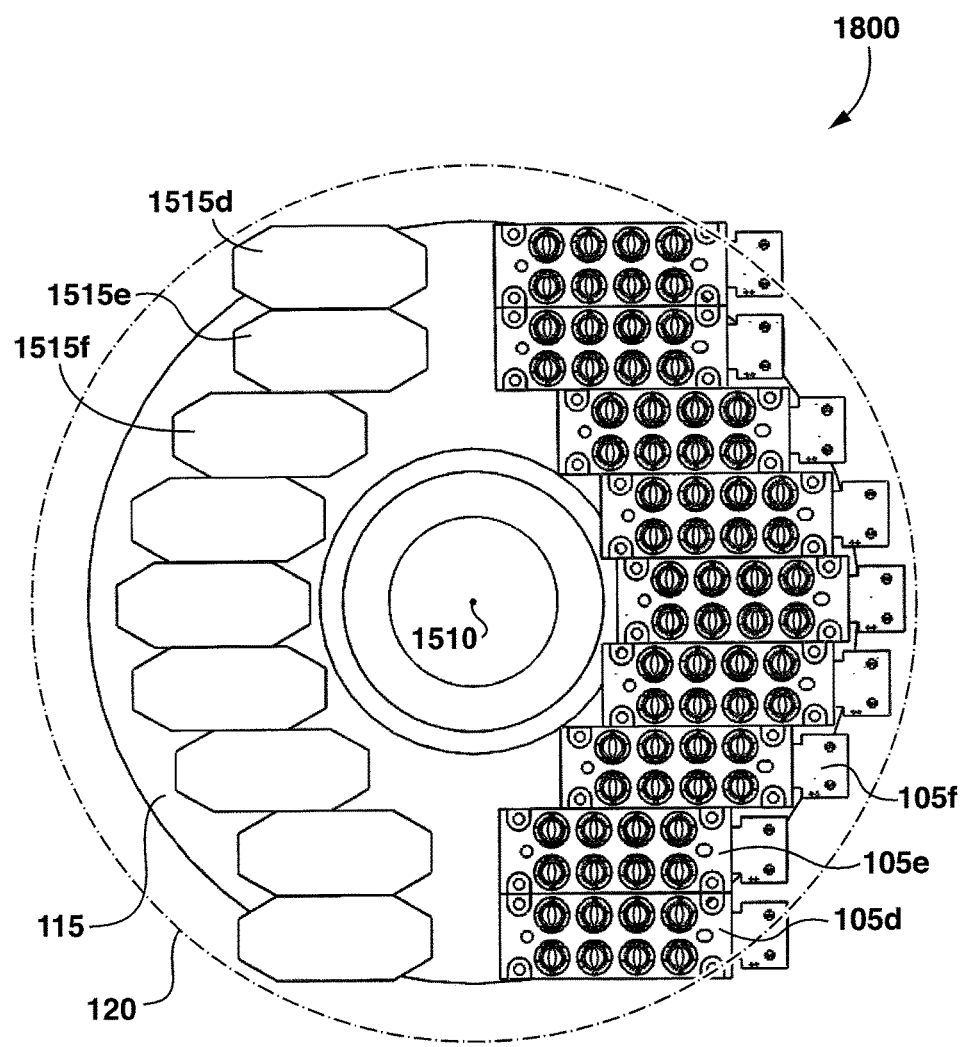
FIG. 18 shows a top plan view of yet another apparatus for wavelength conversion, according to non-limiting implementations.

While FIG. 17 shows a radial positioning of receiving banks and retro reflectors, it is contemplated that receiving banks and retro reflectors can be arranged on receiving bank support 115 in any other suitable arrangement so long as the unabsorbed light beams generated by the input light beams emitted by the light sources received in each receiving bank can reach and be reflected by a corresponding retro reflector. FIG. 18 shows one such other suitable arrangement where receiving banks are arranged parallel to one another on one side of receiving banks support 115 (and to one side of optical axis 1510), and retro reflectors are also arranged parallel to one another but on the opposite side of receiving bank support 115 (and to the opposite side of optical axis 1510).

FIG. 18 shows a top plan view of apparatus 1800, where first reflector 120 is shown in a see-through manner. Apparatus 1800 is similar to apparatus 1500, except for the arrangement of receiving banks and retro reflectors on receiving bank support 115. In apparatus 1800 each receiving bank is abutting its neighboring receiving banks, and similarly each retro reflector is also abutting its neighboring retro reflectors. Each receiving bank is disposed on receiving bank support 115 diametrically opposite (relative optical axis 1510) of a corresponding retro reflector; for example, receiving bank 105d is diametrically opposite retro reflector 1515d, and similarly receiving banks 105e and 105f are diametrically opposite retro reflectors 1515e and 1515f respectively.

While FIG. 18 shows a group of separate receiving banks adjacent to and abutting one another, it is contemplated that apparatus 1800 can instead comprise one or more larger receiving banks each having a capacity (i.e. number of receiving positions) larger than receiving banks 105d, 105e, and 105f. Similarly, it is also contemplated that apparatus 1800 can comprise one more larger retro reflectors each having an area larger than retro reflectors 1515d, 1515e, and 1515f.

Figure 19:
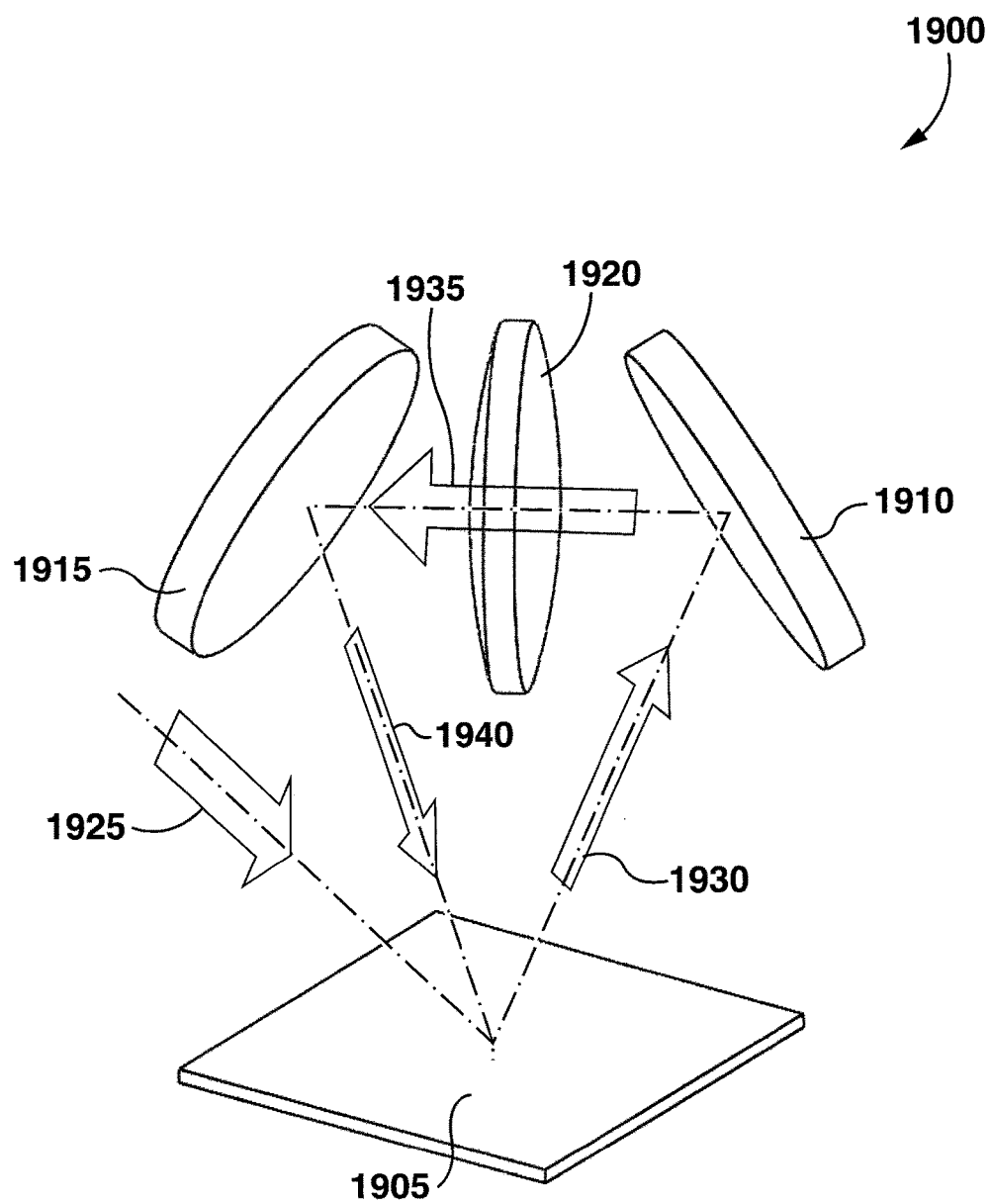
FIG. 19 shows a top perspective view of yet another apparatus for wavelength conversion, according to non-limiting implementations.

Turning now to FIG. 19, an apparatus 1900 for wavelength conversion is shown. Apparatus 1900 comprises a wavelength converter comprising a wavelength conversion material 1905 configured to absorb a first portion of an input light beam 1925 configured to excite wavelength conversion material 1905 to emit an emitted light (not shown in FIG. 19) and to reflect a second portion of the input light beam to form an unabsorbed light beam 1930. Wavelength conversion material 1905 can be similar to wavelength conversion materials 130, 1005, and/or 1205.

Apparatus 1900 also comprises reflectors 1910 and 1915, and lens 1920 disposed between reflector 1910 and reflector 1915. Reflector 1910 is positioned to receive unabsorbed light beam 1930 from wavelength conversion material 1905 and to reflect unabsorbed light beam 1930 through lens 1920 to produce a reflected unabsorbed light beam 1935 incident onto reflector 1915. Reflector 1915 is in turn positioned to receive reflected unabsorbed light beam 1935 from reflector 1910 and to reflect reflected unabsorbed light beam 1935 onto wavelength conversion material 1905 to form a first retro reflected light beam 1940.

As shown in FIG. 19, apparatus 1900 allows for first retro reflected light beam 1940 to be incident upon wavelength conversion material 1905 along a path that is different from and/or does not overlay the paths of either input light beam 1925 or unabsorbed light beam 1930. As such, if a portion of first retro reflected light beam 1940 reflects from wavelength conversion material 1905, that reflected portion will not be propagating along the path of and/or towards the source of input light beams 1925. This in turn reduces the likelihood that any portion of first retro reflected light beams 1940 will reflect from wavelength conversion material 1905, reach the light source emitting input light beam 1925, and potentially damage the light source.

The paths of reflected unabsorbed light beam 1935 and of first retro reflected light beam 1940 can be tailored by adjusting the position, orientation, and/or optical properties of reflectors 1910 and 1915 and lens 1920. Moreover, lens 1920 can comprise a biconvex lens, and/or any other suitable lens, to refocus the unabsorbed light beam 1930 on wavelength conversion material 1905 in the form of first retro reflected light beam 1940. This refocusing can at least partially counteract any divergence that may have been introduced into unabsorbed light beam 1930 as a result of reflection from wavelength conversion material 1905. In addition, refocusing by lens 1920 can concentrate the energy of unabsorbed light beam 1930 onto a small area on wavelength conversion material 1905, thereby achieving a higher intensity of emitted light produced by wavelength conversion material 1905.

Figure 20:
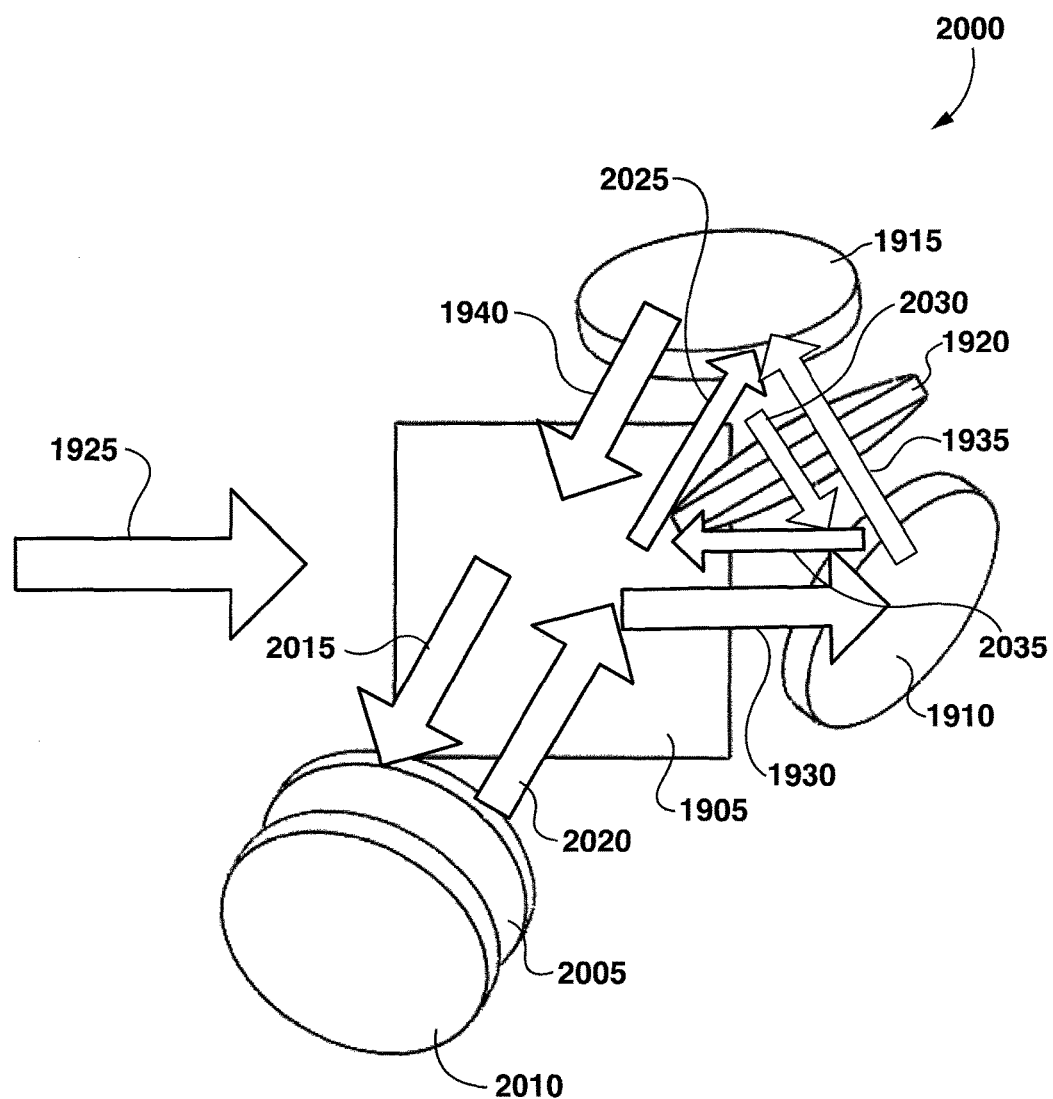
FIG. 20 shows a top plan view of yet another apparatus for wavelength conversion, according to non-limiting implementations.

Turning now to FIG. 20, an apparatus 2000 is shown in a top view, which apparatus can be used for wavelength conversion. Apparatus 2000 shares many components with apparatus 1900, with like/shared components having like numbers. The difference between apparatus 2000 and apparatus 1900 is that apparatus 2000 comprises additional components, namely lens 2005 and reflector 2010. Lens 2005 is disposed between reflector 2010 and wavelength conversion material 1905.

In operation, similar to apparatus 1900, apparatus 2000 produces first retro reflected light beam 1940 from unabsorbed light beam 1930. Wavelength conversion material 1905 can absorb a portion of first retro reflected light beam 1940 and to reflect another portion of first retro reflected light beam 1940 to form a second unabsorbed light beam 2015 propagating through lens 2005 and towards reflector 2010.

Moreover, reflector 2010 can be configured to reflect second unabsorbed light beam 2015 through lens 2005 and onto wavelength conversion material 1905 to form a second retro reflected light beam 2020. A portion of second retro reflected light beam 2020 can be absorbed by wavelength conversion material 1905, while another portion can be reflected by wavelength conversion material 1905 to form a third unabsorbed light beam 2025 propagating towards reflector 1915.

Reflector 1915 can be positioned to receive and reflect third unabsorbed light beam 2025 through lens 1920 to form reflected third unabsorbed light beam 2030 incident onto reflector 1910. Reflector 1910, in turn, receives third unabsorbed light beam 2030 from reflector 1915 and reflects third unabsorbed light beam 2030 to form a third retro reflected light beam 2035 incident onto wavelength conversion material 1905.

Apparatus 2000 can allow for increased efficiency in converting the energy of input light beam 1925 into emitted light emitted by wavelength conversion material 1905 because instead of one retro reflection (as is the case in apparatus 1900), in apparatus 2000 there are three retro reflections allowing the unabsorbed portion of the excitation input light to be redirected back onto the wavelength conversion material 1905 three times. Each of these retro reflection cycles converts into emitted light an additional portion of the energy that was not preciously absorbed by wavelength conversion material 1905.

The path taken by the unabsorbed light beam in each retro reflection cycle can be tailored by adjusting the position, orientation, and/or optical properties of the reflectors and/or lenses that define the respective light path in each retro reflection cycle.

Figure 21:
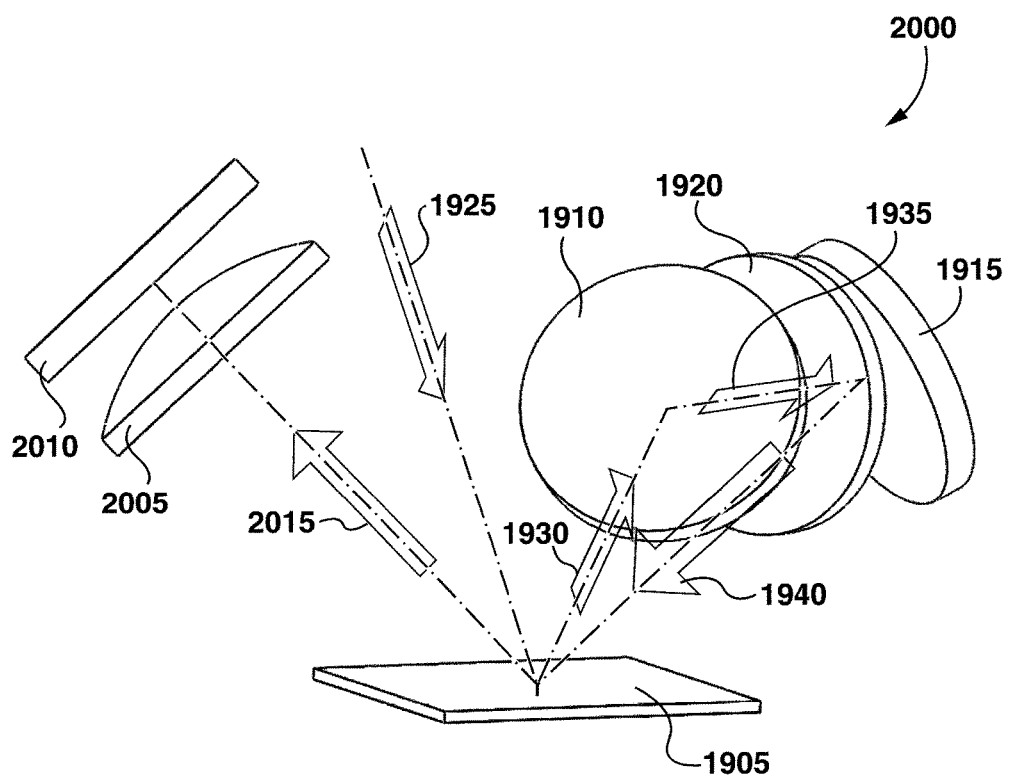
FIG. 21 shows a side view of the apparatus of FIG. 20.

Turning now to FIG. 21, a side view of apparatus 2000 is shown. As depicted in FIG. 21, reflectors 1910, 1915, and 2010 and lenses 1920 and 2005 are positioned on the same side of wavelength conversion material 1905. Moreover, lens 2005 can have any suitable shape, including but not limited to having a flat side positioned to receive second unabsorbed light beam 2015 from wavelength conversion material 1905, and a convex side opposite the flat side. Arrows shown in FIGS. 20 and 21 to indicate the various light beams are not intended to show the exact path of each beam, but rather simply indicate the direction of travel of each respective light beam.

Figure 22:
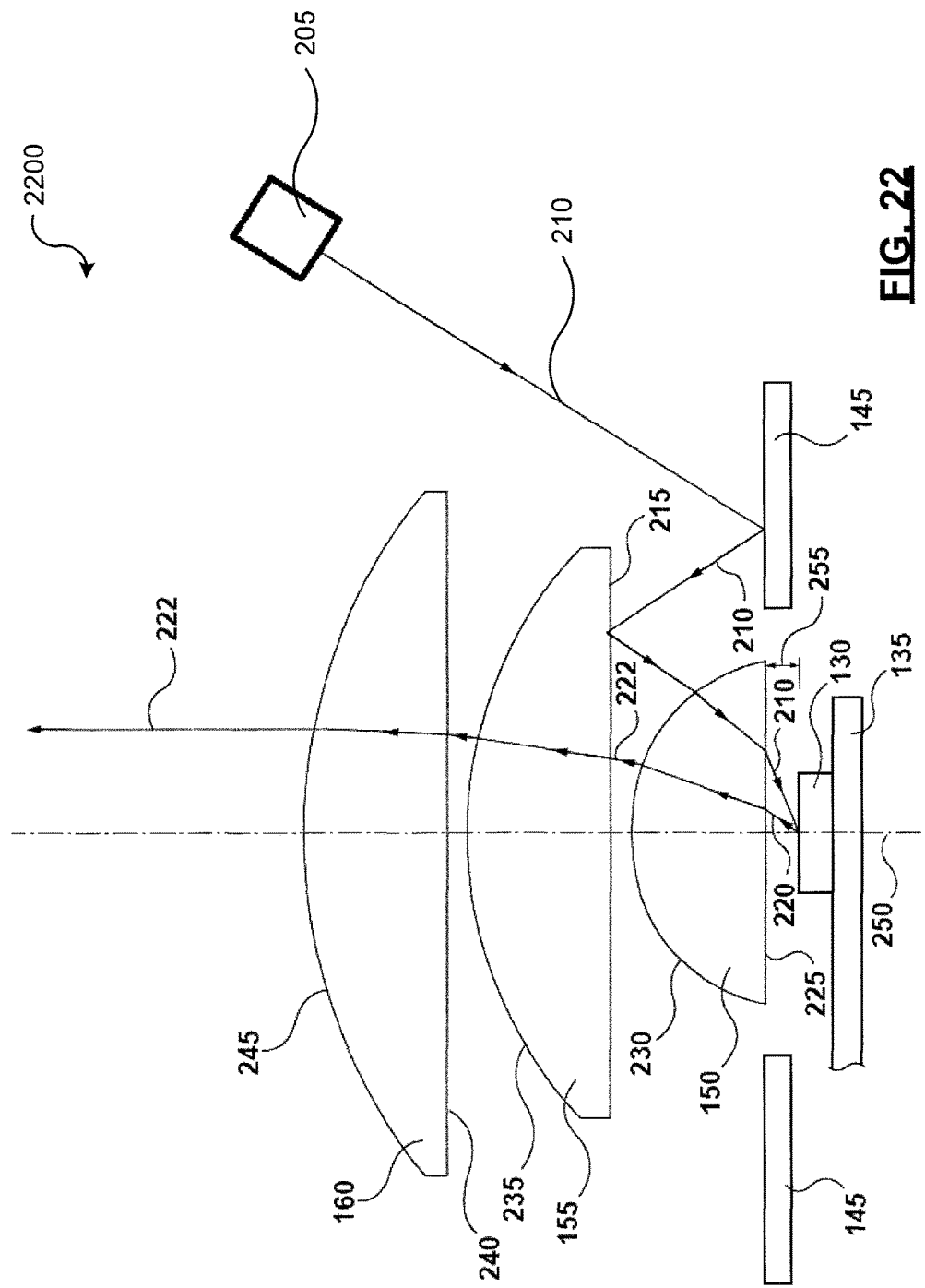
FIG. 22 shows a cross-sectional view of yet another apparatus for wavelength conversion, according to non-limiting implementations.

Turning now to FIG. 22, a cross-section of another apparatus 2200 for wavelength conversion is shown. Apparatus 2200 is similar to apparatus 100 (as shown for example in FIG. 2), with like components having like numbers. The main difference between apparatus 2200 and apparatus 100 is that unlike apparatus 100, apparatus 2200 does not comprise a first reflector 120. In apparatus 2200, light source 205 is positioned and/or oriented to direct input light beam 210 directly onto second reflector 145.

While only one light source 205 is depicted in FIG. 22, it is contemplated that a plurality of light sources can be used, each light source emitting a corresponding input light beam that is at a different angle to second reflector 145. All of these different input light beams can converge at one point or one area on wavelength conversion material 130.

Figure 23:
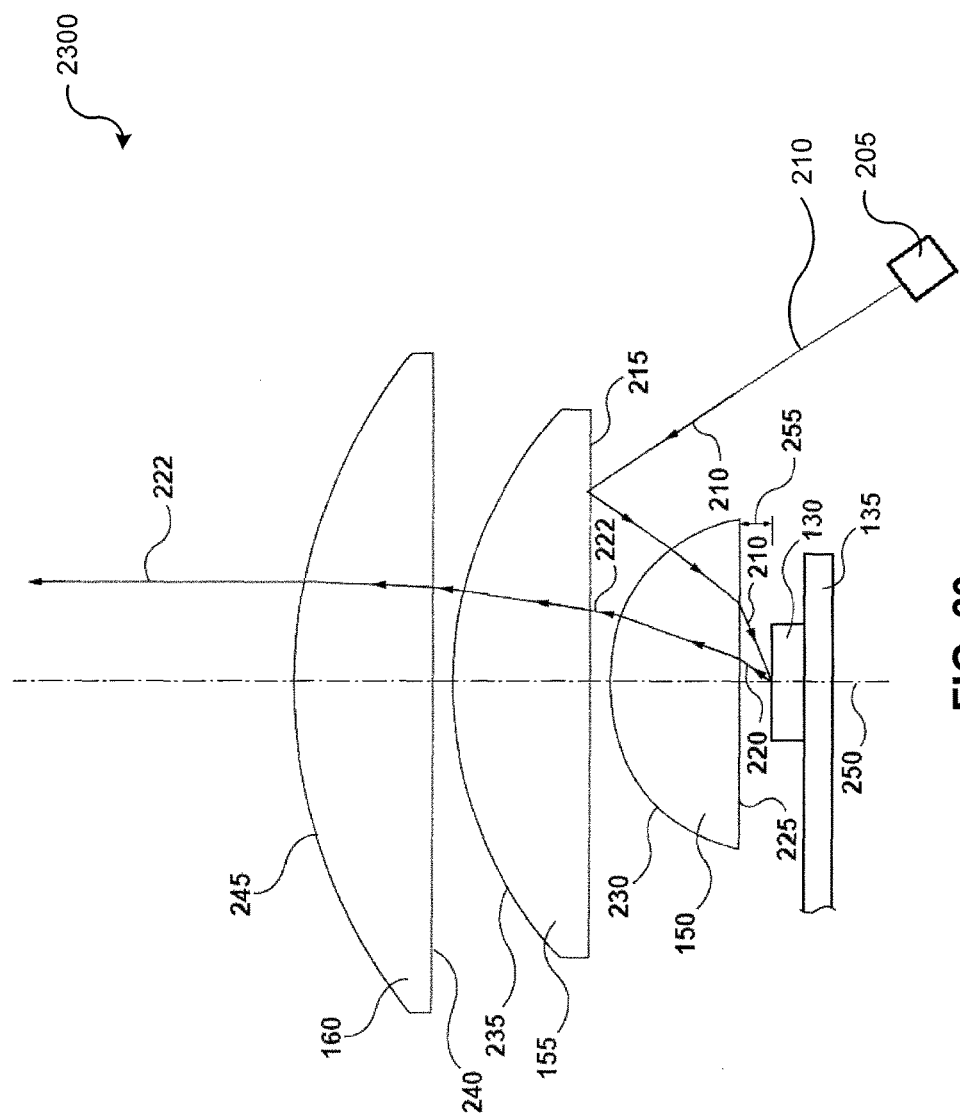
FIG. 23 shows a cross-sectional view of yet another apparatus for wavelength conversion, according to non-limiting implementations.

Turning now to FIG. 23, a cross-section of another apparatus 2300 for wavelength conversion is shown. Apparatus 2300 is similar to apparatus 100 (as shown for example in FIG. 2), with like components having like numbers. The main difference between apparatus 2300 and apparatus 100 is that unlike apparatus 100, apparatus 2300 does not comprise a first reflector 120 or a second reflector 145. In apparatus 2300, light source 205 is positioned and/or oriented to direct input light beam 210 directly onto third reflector, i.e. flat side 215 of second lens 155.

While only one light source 205 is depicted in FIG. 23, it is contemplated that a plurality of light sources can be used, each light source emitting a corresponding input light beam that is at a different angle to the third reflector. All of these different input light beams can converge at one point or one area on wavelength conversion material 130.

The above-described implementations are intended to be exemplary and alterations and modifications may be effected thereto, by those of skill in the art, without departing from the scope of the invention which is defined solely by the claims appended hereto.

The invention claimed is:

1. An apparatus for wavelength conversion, the apparatus comprising:
   a wavelength converter comprising a wavelength conversion material;
   a first reflector, a second reflector, a third reflector, and a first lens;
   the first reflector configured to reflect a plurality of input light beams onto the second reflector, the first reflector having a curvature configured to increase a convergence of the input light beams reflected from the first reflector;
   the second reflector configured to reflect the input light beams onto the third reflector;
   the first lens disposed between the wavelength converter and the third reflector, the first lens disposed proximate to the wavelength converter;
   the third reflector configured to reflect the input light beams through the first lens and onto the wavelength conversion material, the input light beams configured to excite the wavelength conversion material to emit an emitted light being wavelength-shifted relative to the input light beams;
   the first lens configured to receive at least a portion of the emitted light, to reduce a divergence of the portion of the emitted light, and to at least partially transmit the portion of the emitted light to form an output light propagating towards the third reflector; and
   the third reflector further configured to at least partially transmit the output light;
   wherein a first input light beam of the plurality of input light beams is laterally spaced away from an optical axis of the output light by a first distance, and a second input light beam of the plurality of input light beams is laterally spaced away from the optical axis by a second distance different from the first distance.

2. An apparatus for wavelength conversion, the apparatus comprising:
   a wavelength converter comprising a wavelength conversion material;
   a first reflector, a second reflector, a third reflector, a first lens, and a second lens;
   the first reflector configured to reflect a plurality of input light beams onto the second reflector, the first reflector having a curvature configured to increase a convergence of the input light beams reflected from the first reflector;
   the second reflector configured to reflect the input light beams onto the third reflector;
   the first lens disposed between the wavelength converter and the third reflector, the first lens disposed proximate to the wavelength converter, the third reflector disposed on the second lens;
   the third reflector configured to reflect the input light beams through the first lens and onto the wavelength conversion material, the input light beams configured to excite the wavelength conversion material to emit an emitted light being wavelength-shifted relative to the input light beams;
   the first lens configured to receive at least a portion of the emitted light, to reduce a divergence of the portion of the emitted light, and to at least partially transmit the portion of the emitted light to form an output light propagating towards the third reflector;
   the third reflector further configured to at least partially transmit the output light; and
   the second lens configured to receive the output light propagating from the first lens, the second lens configured to further reduce the divergence of the output light.

3. The apparatus of claim 2, wherein the second lens comprises a flat side configured to receive the output light and a convex side opposite the flat side, the third reflector being disposed on the flat side.

4. The apparatus of claim 2, wherein the third reflector comprises a dichroic coating configured to reflect the input light beams and transmit the output light.

5. The apparatus of claim 4, further comprising a third lens configured to receive the output light propagating from the second lens, the third lens configured to further reduce the divergence of the output light.

6. The apparatus of claim 5, wherein one or more of:
   the first lens comprises a first side configured to receive the portion of the emitted light, and a corresponding convex side opposite the first side; and
   the third lens comprises a corresponding flat side configured to receive the output light from the second lens and a corresponding convex side opposite the corresponding flat side.

7. The apparatus of claim 6, wherein the first side comprises one or more of:
   a corresponding flat side; and
   a concave side.

8. The apparatus of claim 6, wherein one or more of the first lens, the second lens, and the third lens are hemispherical.

9. The apparatus of claim 2, wherein the first reflector comprises a parabolic reflector.

10. The apparatus of claim 9, wherein the parabolic reflector defines an aperture for passage of the output light.

11. The apparatus of claim 2, wherein the first reflector, the second reflector, the third reflector, and the first lens are configured to converge the input light beams at the wavelength conversion material.

12. The apparatus of claim 2, wherein the wavelength conversion material is disposed on the second reflector, and the second reflector comprises a surface of a heat sink.

13. The apparatus of claim 2, wherein a first distance between the second reflector and the first lens is equal to or smaller than a second distance between the wavelength conversion material and the first lens.

14. The apparatus of claim 2, further comprising a plurality of light sources each configured to emit a corresponding one of the input light beams.

15. The apparatus of claim 14, wherein the plurality of light sources are mounted on a common surface being thermally coupled to a heat sink.

16. The apparatus of claim 14, wherein the input light beams are about parallel to one another.

17. The apparatus of claim 2, wherein the first lens is spaced from the wavelength converter by a gap.

18. The apparatus of claim 17, wherein the gap is in a range of about 1 mm to about 2 mm.

19. The apparatus of claim 2, wherein the wavelength conversion material comprises one of a phosphor and quantum dots.

20. The apparatus of claim 2, wherein the wavelength conversion material is shaped as a ring and the wavelength converter is rotatable about a center of the ring.

* * * * *